(12) United States Patent
Gevedon

(10) Patent No.: US 6,910,895 B1
(45) Date of Patent: Jun. 28, 2005

(54) CAST PRACTICE FISH

(76) Inventor: Hank Gevedon, 3135 Highway 1781, Waynesburg, KY (US) 40489

( * ) Notice: Subject to any disclaimer, the term of this patent is extended or adjusted under 35 U.S.C. 154(b) by 0 days.

(21) Appl. No.: 10/655,332

(22) Filed: Sep. 4, 2003

(51) Int. Cl.⁷ .............................................. G09B 9/00

(52) U.S. Cl. ...................................................... 434/247

(58) Field of Search ................................ 434/247, 258, 434/433; 446/139, 153, 154, 156, 158; 273/140; 43/4, 17, 17.6

(56) References Cited

U.S. PATENT DOCUMENTS

| | | |
|---|---|---|
| 420,149 A | 1/1890 | Elson |
| 464,391 A | 12/1891 | Samuels |
| 484,950 A | 10/1892 | Dungey |
| 2,107,672 A | 2/1938 | Lang |
| 2,146,194 A | 2/1939 | Rubens |
| 2,320,145 A | 5/1943 | La Due |
| 2,598,487 A | 5/1952 | Anechlarico |
| 2,611,617 A | 9/1952 | Strohm |
| 2,703,469 A | 3/1955 | Raizen |
| 3,128,096 A | 4/1964 | Hammond |
| 3,463,494 A | 8/1969 | Stroh |
| 3,620,532 A | 11/1971 | Graf |
| 3,646,691 A * | 3/1972 | French ........................ 434/247 |
| 3,864,872 A | 2/1975 | Hoetzel |
| 4,479,329 A | 10/1984 | Fraden |
| 4,637,603 A * | 1/1987 | Fry et al. ..................... 472/137 |
| 4,744,565 A | 5/1988 | Newberger |
| 4,976,439 A | 12/1990 | Kraemer |
| 5,110,136 A | 5/1992 | Land |
| 5,297,355 A | 3/1994 | O'Brien |
| 5,344,357 A | 9/1994 | Lyczek |
| 5,848,791 A | 12/1998 | Beyer |
| 5,941,528 A | 8/1999 | Boivin, Jr. |
| 6,179,683 B1 | 1/2001 | Pell et al. |
| 6,412,211 B1 | 7/2002 | Smith |
| 6,471,565 B2 | 10/2002 | Simeray |
| 2002/0148154 A1 | 10/2002 | Merrit |

FOREIGN PATENT DOCUMENTS

| | | |
|---|---|---|
| FR | 96440094 | 5/1997 |
| JP | 06065667 A | 9/1995 |
| JP | 10026531 A | 8/1999 |
| JP | 0021665 A1 | 9/2001 |

OTHER PUBLICATIONS

V.G. Sternin; Electrical fishing: Theory and practice; U.S.S.R.

Paul Worth; The Old Man and the CD; PC World.

M. Helton; Use of Video Taping During Simulator Training; U.S.

V. Monfort; Designing a Simulator for the Fishing Idus;Thriteenth International Conference Artificial Intelligence, Expert Systems, Natural Language Proceedings; 1993; France.

William Tapply; The Fishing Game; Field & Stream; vol. 101.

"Sega Bass Fishing 2"; Sega Dreamcast Lures Gamers with the Most Realistic Fishing Experience; Newswire; Aug. 21, 2001.

(Continued)

*Primary Examiner*—Kurt Fernstrom
(74) *Attorney, Agent, or Firm*—Stockwell & Associates, PSC

(57) ABSTRACT

A motorized, radio-controlled practice fish for improving a operator's casting ability is disclosed. The practice fish can detect a lure in two different modes, active or passive. When in active mode, the practice fish responds to signals sent by a lure having an IR transmitter. When in passive mode, sensors within the practice fish respond to light signals emitted at a certain frequency and wavelength reflected from a lure back to the practice fish. An instructor can move the practice fish using a remote control device, or the practice fish can be set in one of several traveling modes.

51 Claims, 30 Drawing Sheets

OTHER PUBLICATIONS

Sega Hooks Players with Marine Fishing for Dreamcast; Sequel to Top Selling "Sega Bass Fishing" Gives Players the Thrill of Deep Sea Fishing; Newswire; Oct. 16, 2000.

Immersion Licenses ThouchSense Technology to Maicomet; Immersion TouchSense to be Used in Maicomet Products; Newswire; Jun. 8, 2000.

* cited by examiner

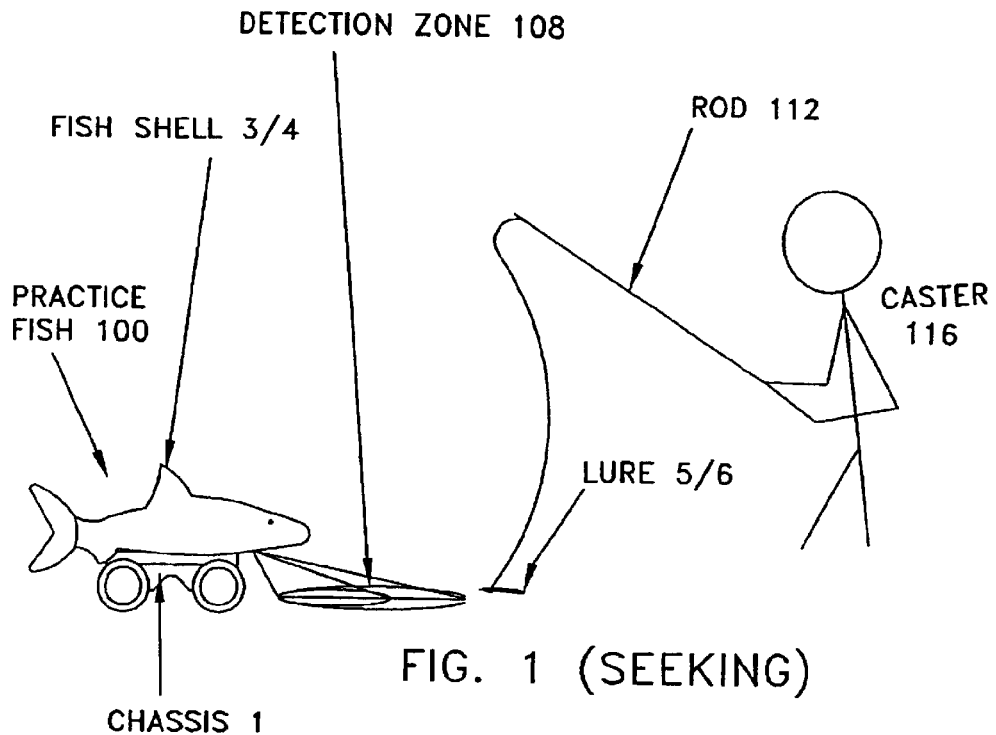
FIG. 1 (SEEKING)
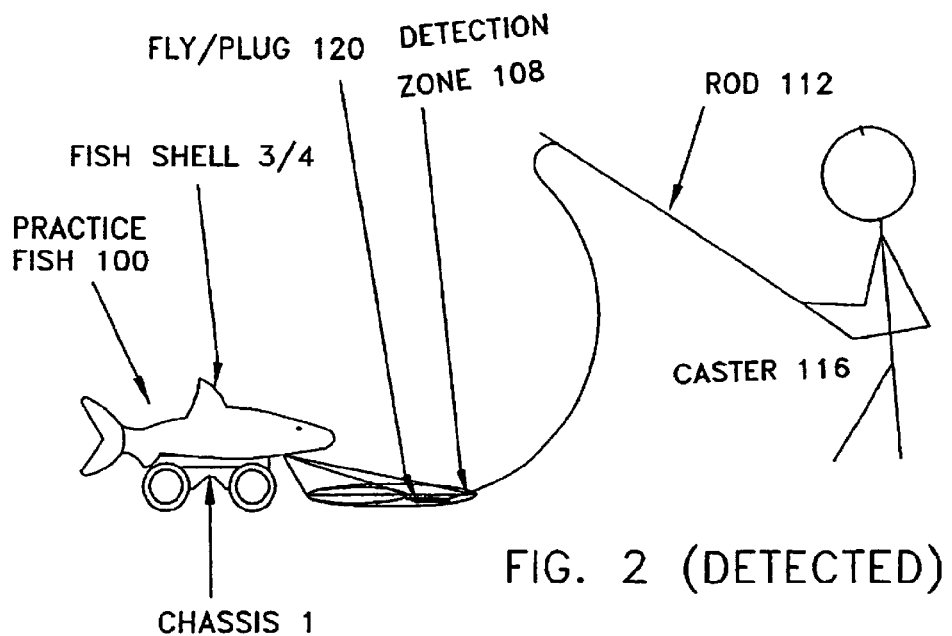
FIG. 2 (DETECTED)

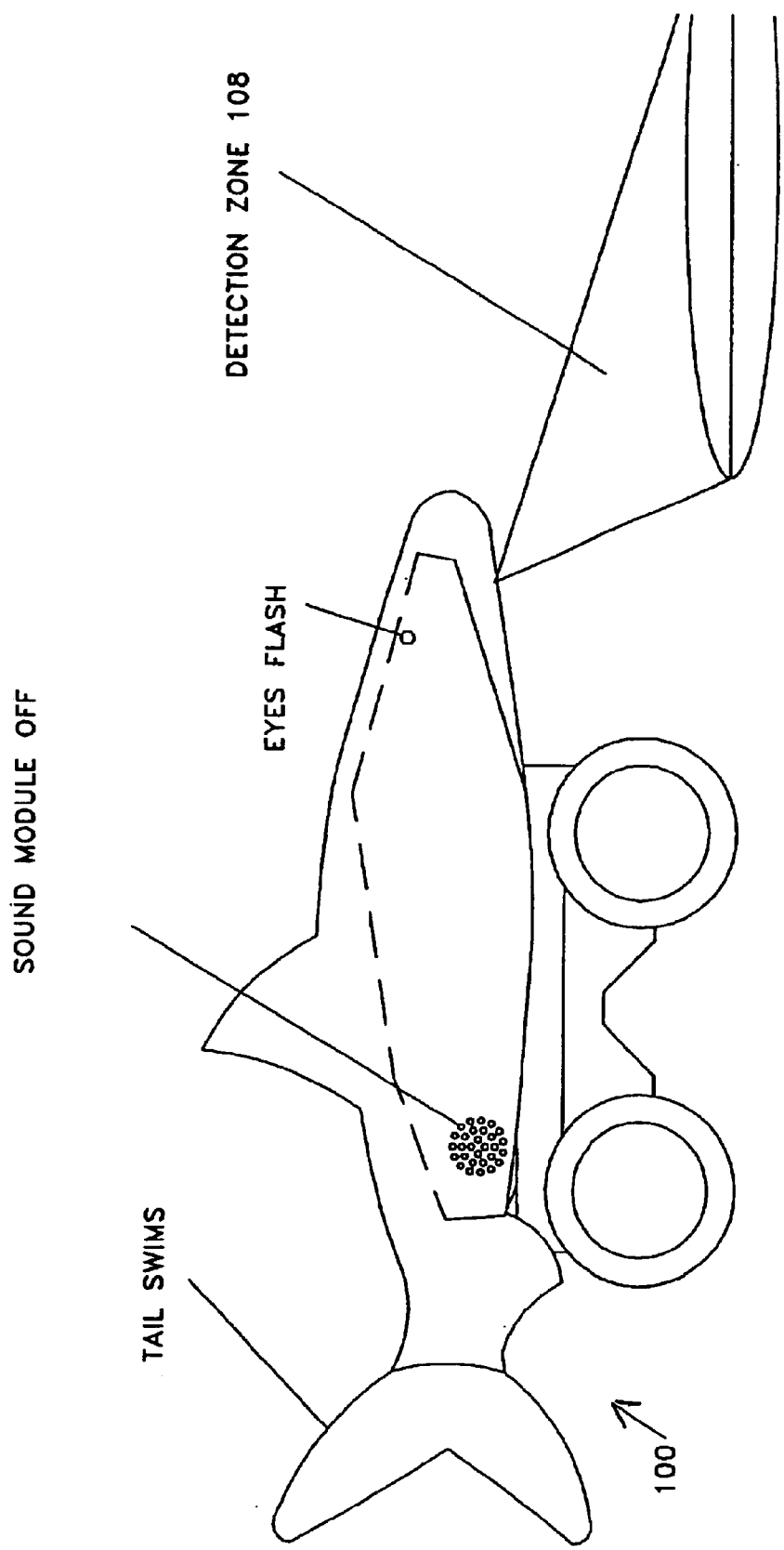
FIG. 3 (SEEKING)

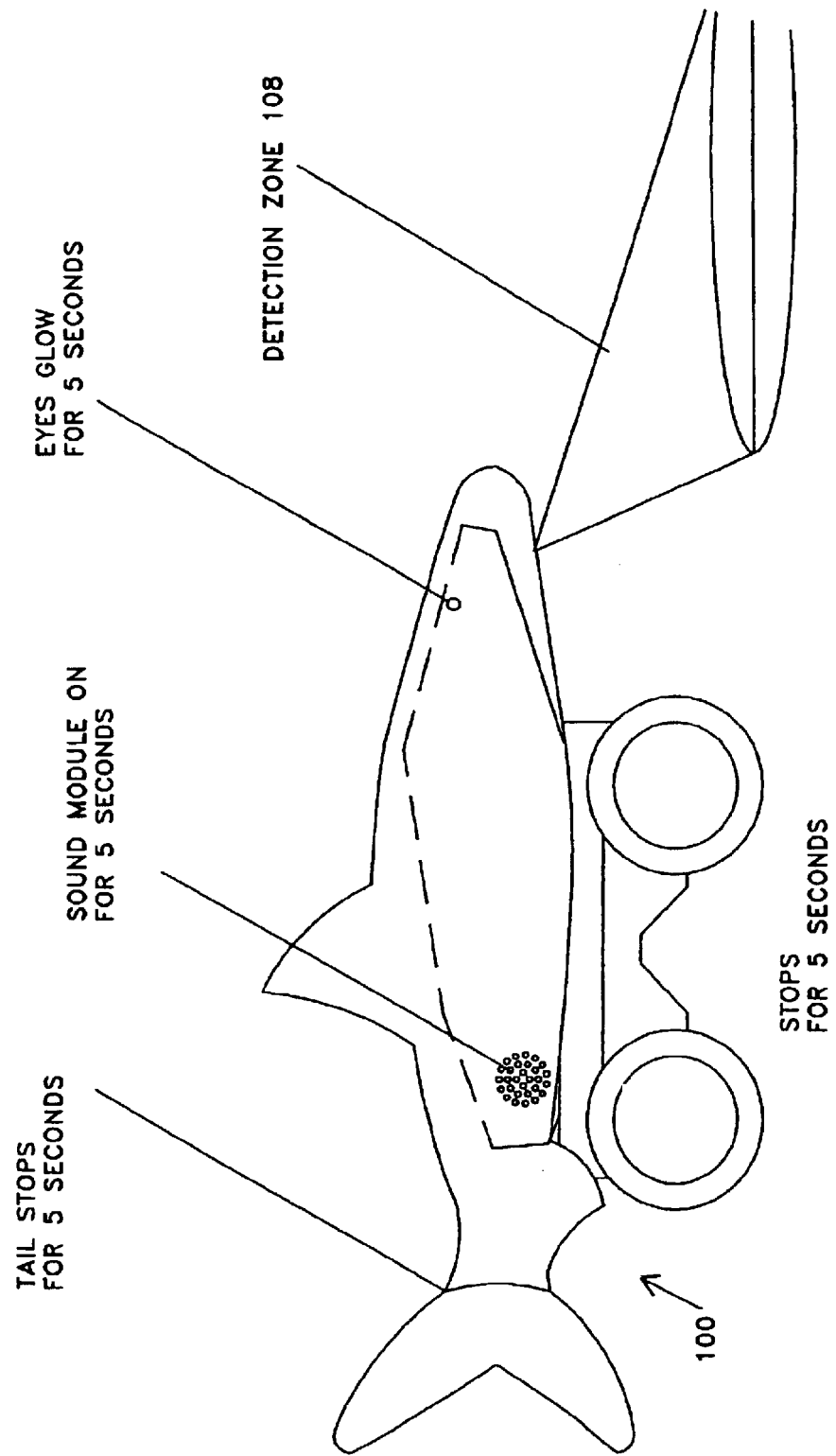
FIG. 4 (DETECTED)

(ACTIVE MODE)

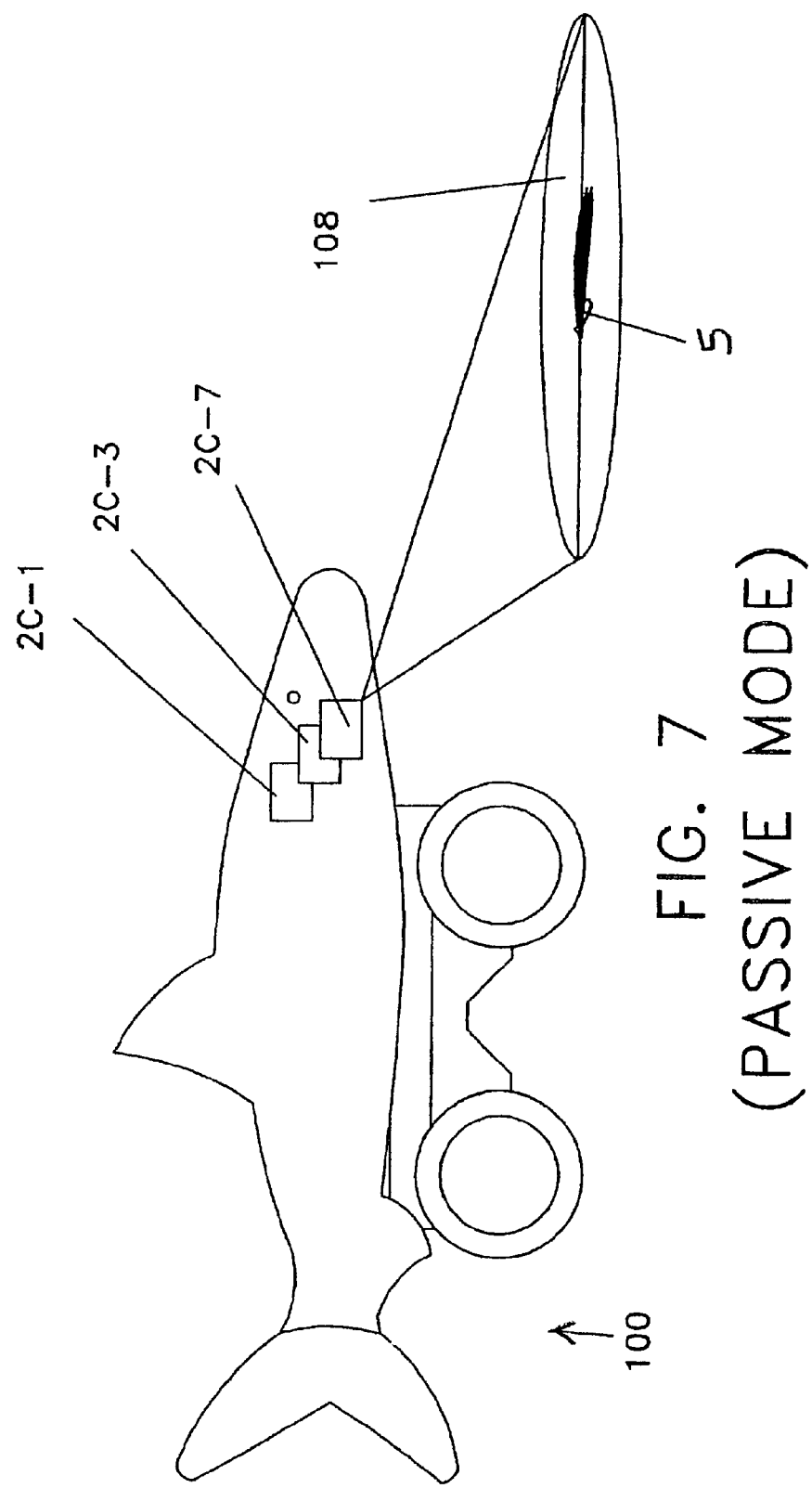
FIG. 7 (PASSIVE MODE)

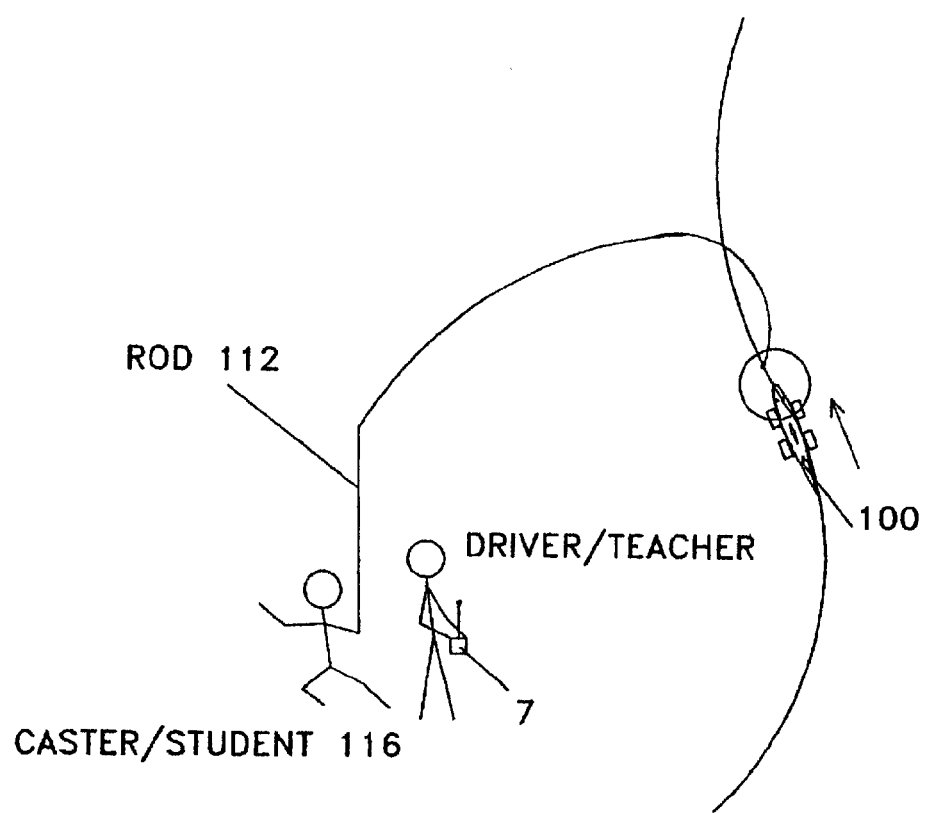
FIG. 8 (MANUAL MODE)

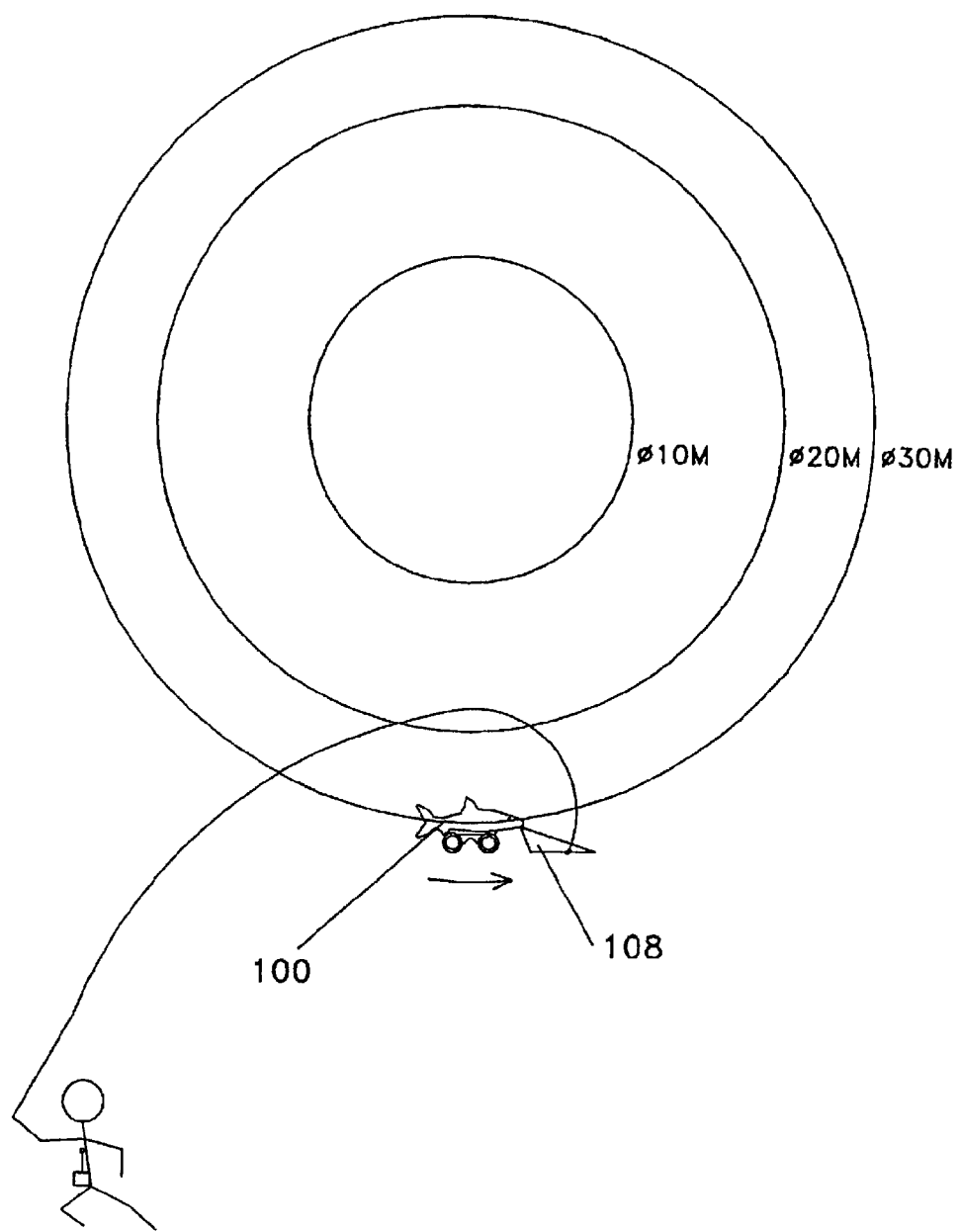
FIG. 9 (CIRCULAR MODE)

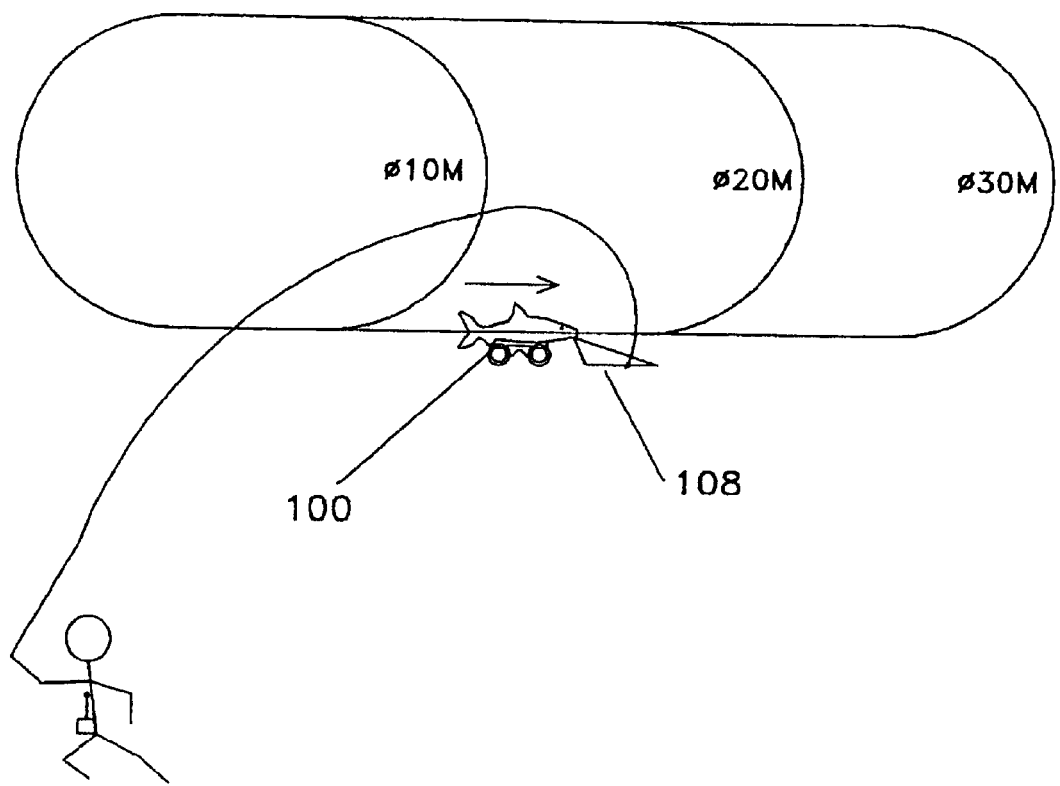
FIG. 10 (LOOP MODE)

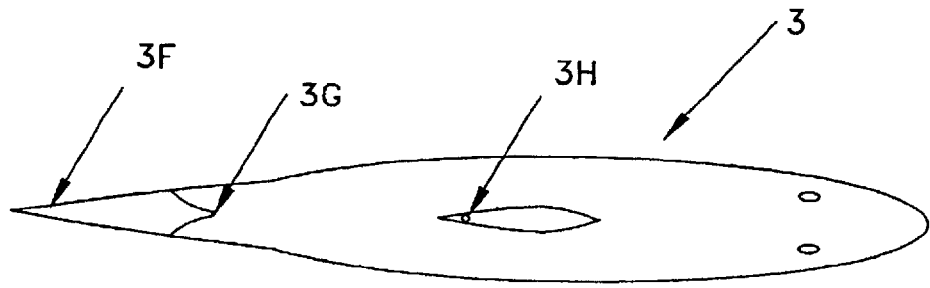
FIG. 14A (BONEFISH)
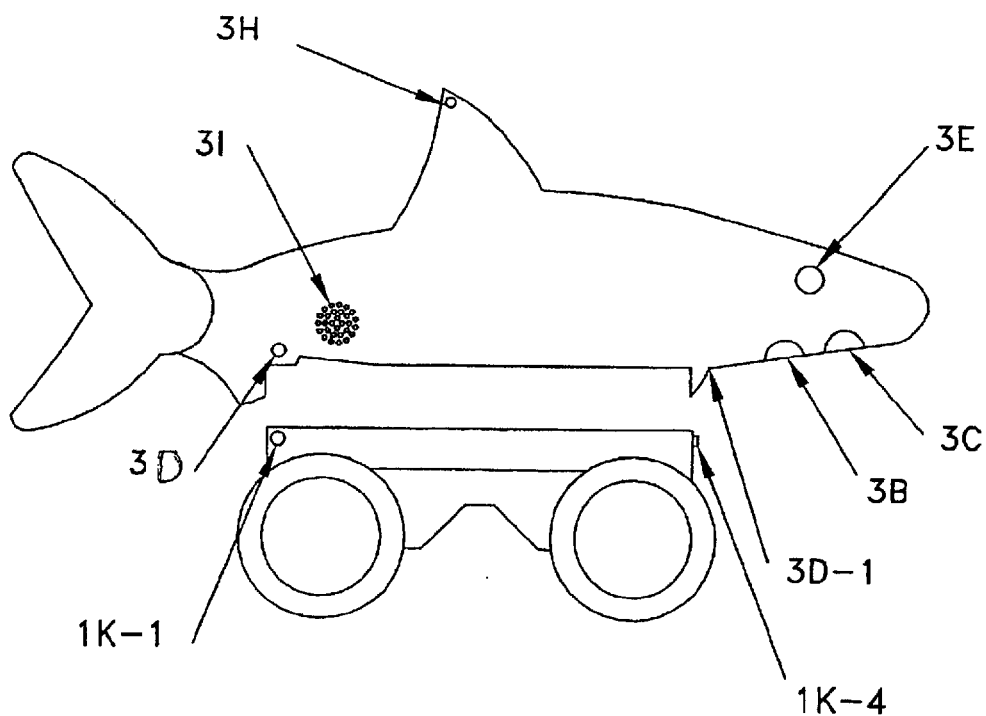
FIG. 14B (BONEFISH)

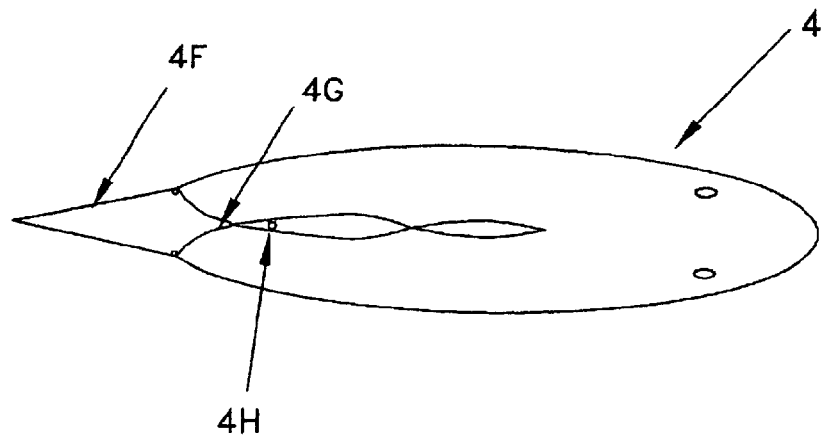
FIG. 15A (BASS FISH)
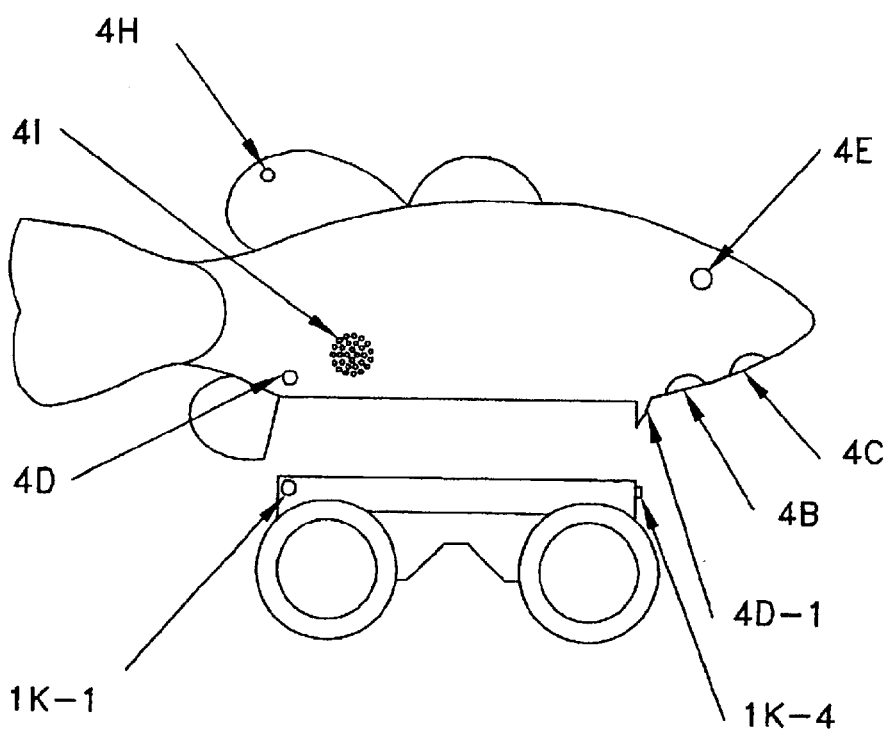
FIG. 15B (BASS FISH)

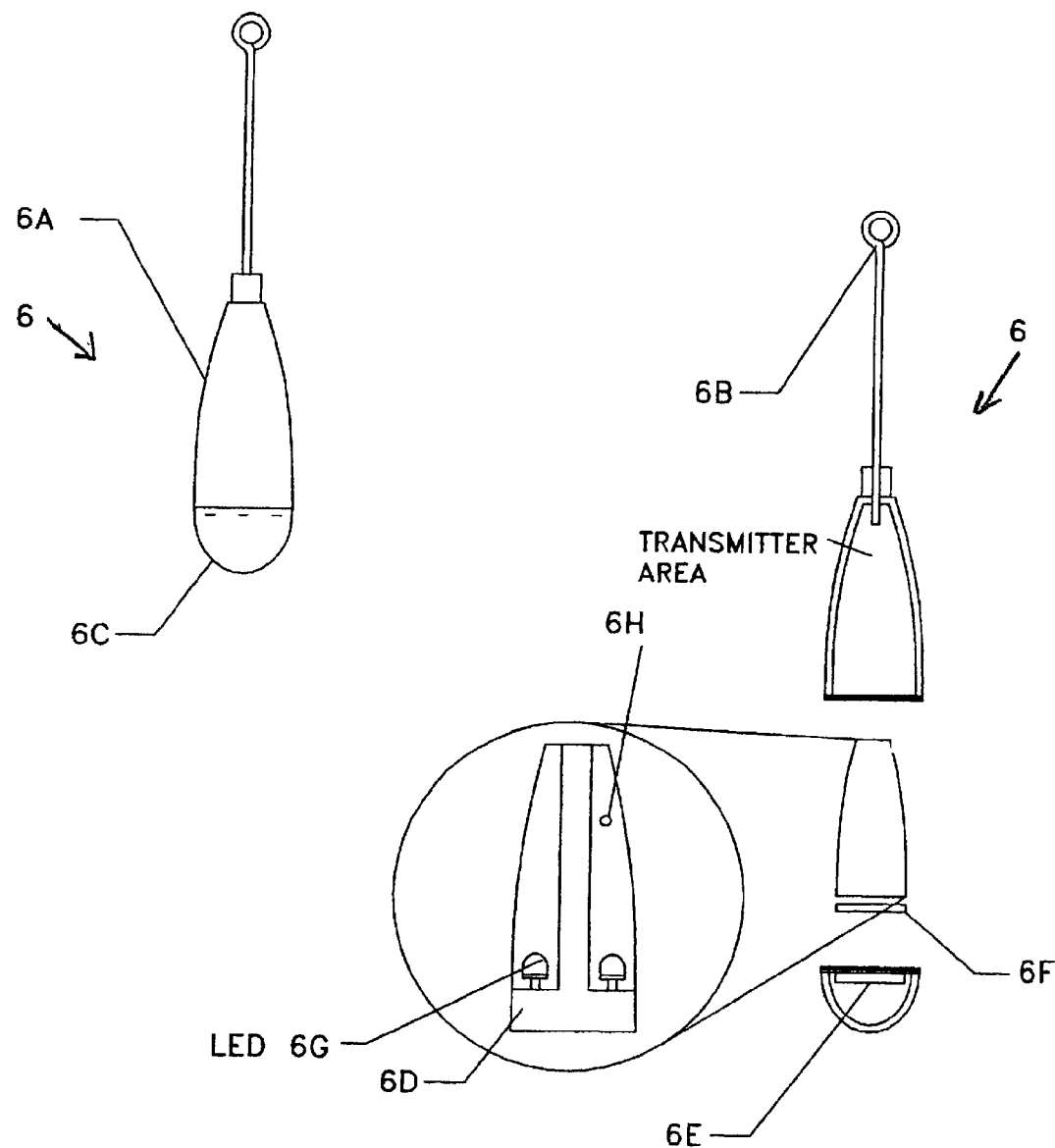

us 6,910,895 B1

CAST PRACTICE FISH

FIELD OF THE INVENTION

This invention relates generally to a mechanical practice fish which can be used to assist operators in learning how to effectively cast fishing lures.

BACKGROUND OF THE INVENTION

Success with the sport of fishing depends on one's ability to accurately place a fly or lure in the correct spot in relationship to the fish. For example, if one casts too far away from the fish, the fish might not respond. If one casts too close to the fish, this may scare the fish. Sometimes a fisherperson will cast to a fish that is not moving, in which case the fly or lure should be placed in a strike zone in front of the fish. Placing a fly or lure in the fish's strike zone means that the fly or lure is placed in a position and manner such that the fish will bite the lure or fly. Sometimes a fisherperson casts to a moving fish, this requires the fisherperson to place the fly or lure in a strike zone ahead of the moving fish by anticipating the path of the fish. Unfortunately, casting to a moving fish can be a difficult situation to simulate in a teaching situation. Consequently, a device for accurately simulating the behavior of a stationary or moving fish is desired.

BRIEF SUMMARY OF THE INVENTION

This invention has as its primary objective the ability to allow an instructor to simulate many fishing situations with a student. However, the invention will also allow an individual to practice more effectively when alone. Having a fish shaped training device which actually moves and is capable of performing a detection cycle in which the fish stops when cast to correctly will give immediate feedback to the student who is trying to learn to cast correctly. When cast to correctly, the fish shaped training device will stop, its eyes will glow, and it will make a noise similar to line being stripped off a reel. This will be immediate positive feedback. When cast to incorrectly, the fish will remain in seeking mode.

It is a further object of this invention to provide a teaching aid for use in casting and placing a fly/lure to a fish that is in motion. It is a further object of this invention to provide a means of giving positive audio and visual feedback when a cast is placed correctly. It is a further object of this invention to design a practice aid, which is safe, sturdy and practical, and that can be used on flat, level surfaces, indoors or outdoors. It is a further object of this invention to design a practice aid device, which may be used individually, or in a teacher/pupil setting to simulate fishing situations. It is a further object of this invention to design a practice aid device, which is capable of automatically moving in a preprogrammed loop-shaped path, or in a circular path.

These and other objects and advantages of the invention will become readily apparent as the following description is read in conjunction with the accompanying drawings.

BRIEF DESCRIPTION OF THE DRAWINGS

FIGS. 1 and 3 show the present invention in seeking mode;

FIGS. 2 and 4 show the present invention in detected mode;

FIG. 7 shows the present invention in passive mode;

FIGS. 8, 9, and 10 show the present invention in manual, circular, and loop mode, respectively;

FIGS. 14A and 14B shows the bone fish embodiment of the present invention;

FIGS. 15A and 15B shows the bass fish embodiment of the present invention;

FIGS. 18 and 19 show the IR lure for use in active detection mode;

FIGS. 28A and 28B shows the mechanism for mounting a shell onto the

DETAILED DESCRIPTION OF THE PREFERRED EMBODIMENTS

Figure 5:
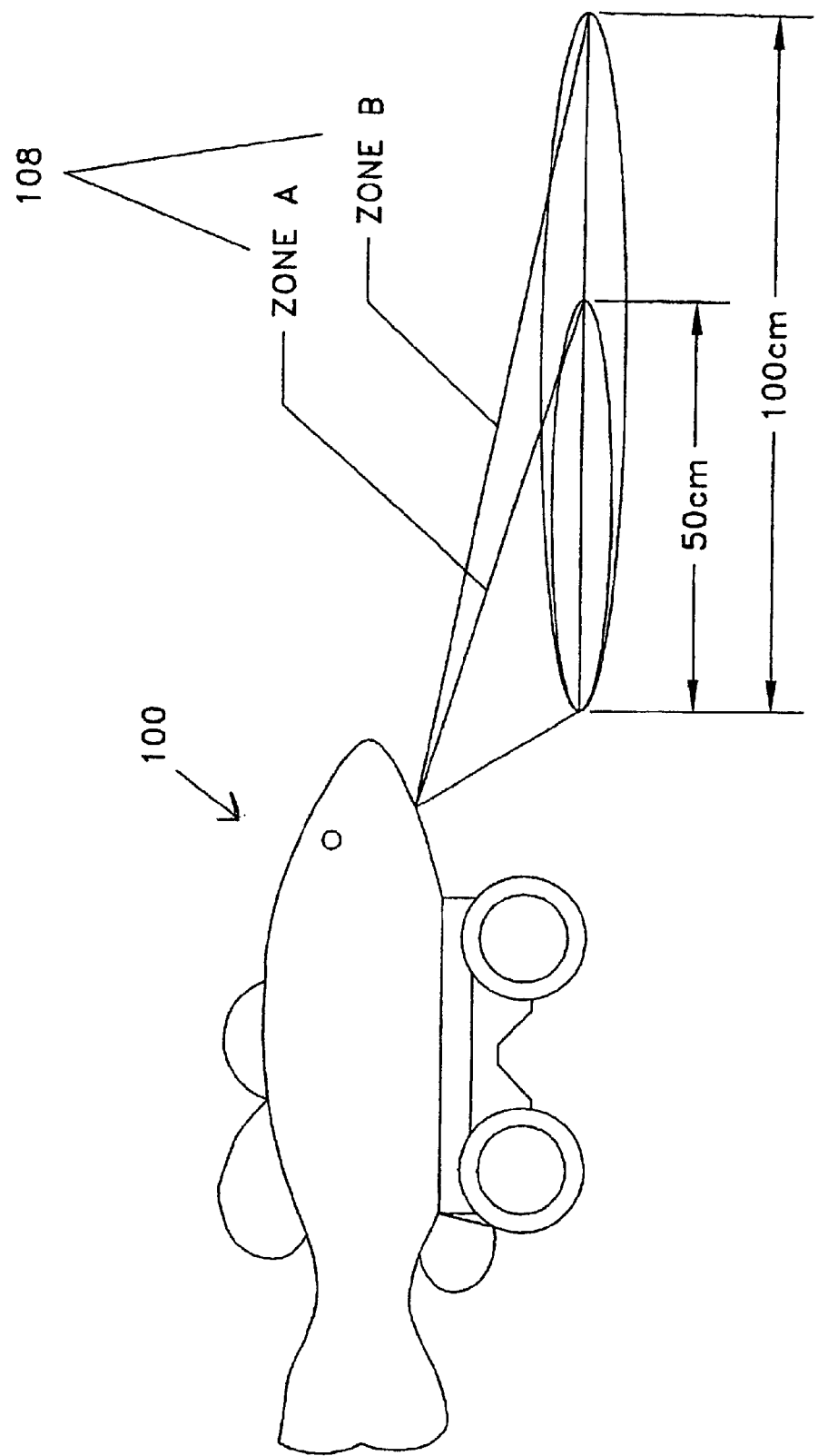
FIG. 5 shows the detection zone of FIGS. 1–4.

This invention results from the realization that to truly teach and practice casting to a person or refine casting skills during practice, the use of a simulated moving fish is needed. As shown in FIG. 1, this is accomplished by using a plastic shaped fish shell 3/4 mounted on a four-wheel chassis 1 which can be remotely controlled much like a child's toy vehicle. The chassis 1 has several fish shaped shell bodies that can be mounted thereupon. This allows a caster 116 holding a rod 112 to practice, for example, with a saltwater bone fish or a freshwater bass fish. Large mouth bass are often fished for by people who cast spinning or bait casting, plug type baits, while bone fish are often fished for by fly fishers who cast small, lightweight flies to the fish. The plastic shells 3/4 may be easily interchanged by snapping them on or off the chassis 1.

Overview

The practice fish 100 has several electronic components which combine to allow it to detect when a specially configured lure 5/6 has been cast to within a specific distance of the fish's head. This specific distance defines the detection zone 108. As shown in FIGS. 1 and 3, when the lure 5/6 is not within the detection zone 108, the practice fish is in seeking mode and the tail moves back and forth in a swimming motion. However, when the lure 5/6 comes within the detection zone 108, the practice fish 100 has eyes that glow, the tail stops moving, and a small speaker which may be silent or make a noise similar to that of line very quickly coming off of a fishing reel, as shown in FIGS. 2 and 4.

FIG. 5 shows more detail of the detection zone 108. In FIG. 5, zone A is the primary detection zone and is smaller than but contained within a secondary detection zone B. Exemplary sizes for detection zones A and B are 50 cm and 100 cm, respectively, although these sizes are merely examples and the present invention should not be considered as limited exclusively thereto. Using a switch (not shown) on the chassis 1, the detection zone can be set larger for a beginner and then smaller as the caster advances in skill level.

Figure 16:
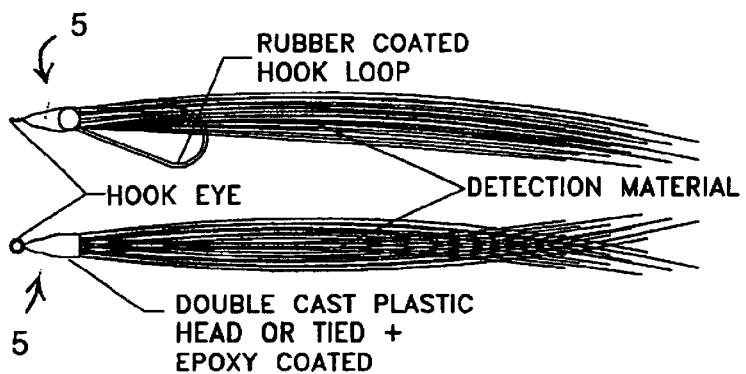
FIGS. 16 and 17 show the reflective lure for use in passive detection mode.
Figure 17:
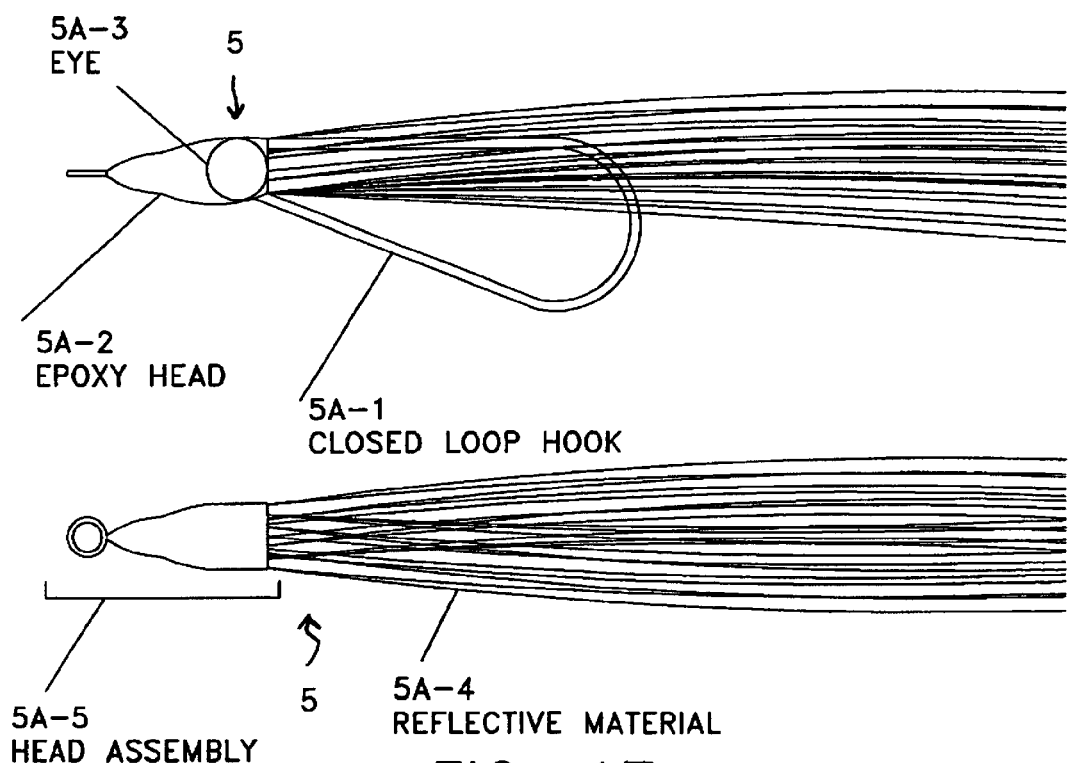

The practice fish 100 can move in a predetermined fashion (FIGS. 9, 10), or be guided by an operator or instructor using a remote controller 7 (FIG. 8). The lure 5/6 may then be cast in the path of the moving practice fish 100, which will seek for the lure 5/6 using one of two modes. One mode is called active detection, where the practice fish 100 detects the infrared light which is given off by an IR lure 6 (FIGS. 6, 18, 19, and 26) which has a small circuit board and battery which powers the diodes that give off the infrared light. The other mode is called passive detection. When using passive detection, the practice fish 100 emits infrared light and the reflective lure 5 has a very shiny coating which reflects the emitted light back to the detector, as shown in FIGS. 7, 16 and 17.

When the practice fish 100 is driven using a remote control transmitter 7 (FIG. 8), this is called manual mode. Manual mode allows a person to stand in one spot, drive the practice fish 100 out to a specific casting distance or area, stop the fish, and cast to it as it idly remains stationary. Another option would be for one person to drive the practice fish 100 while another person casts to it, either while moving or stationary. Further, the practice fish may be operated in program mode where it will travel in a set of predetermined patterns.

Figure 12:
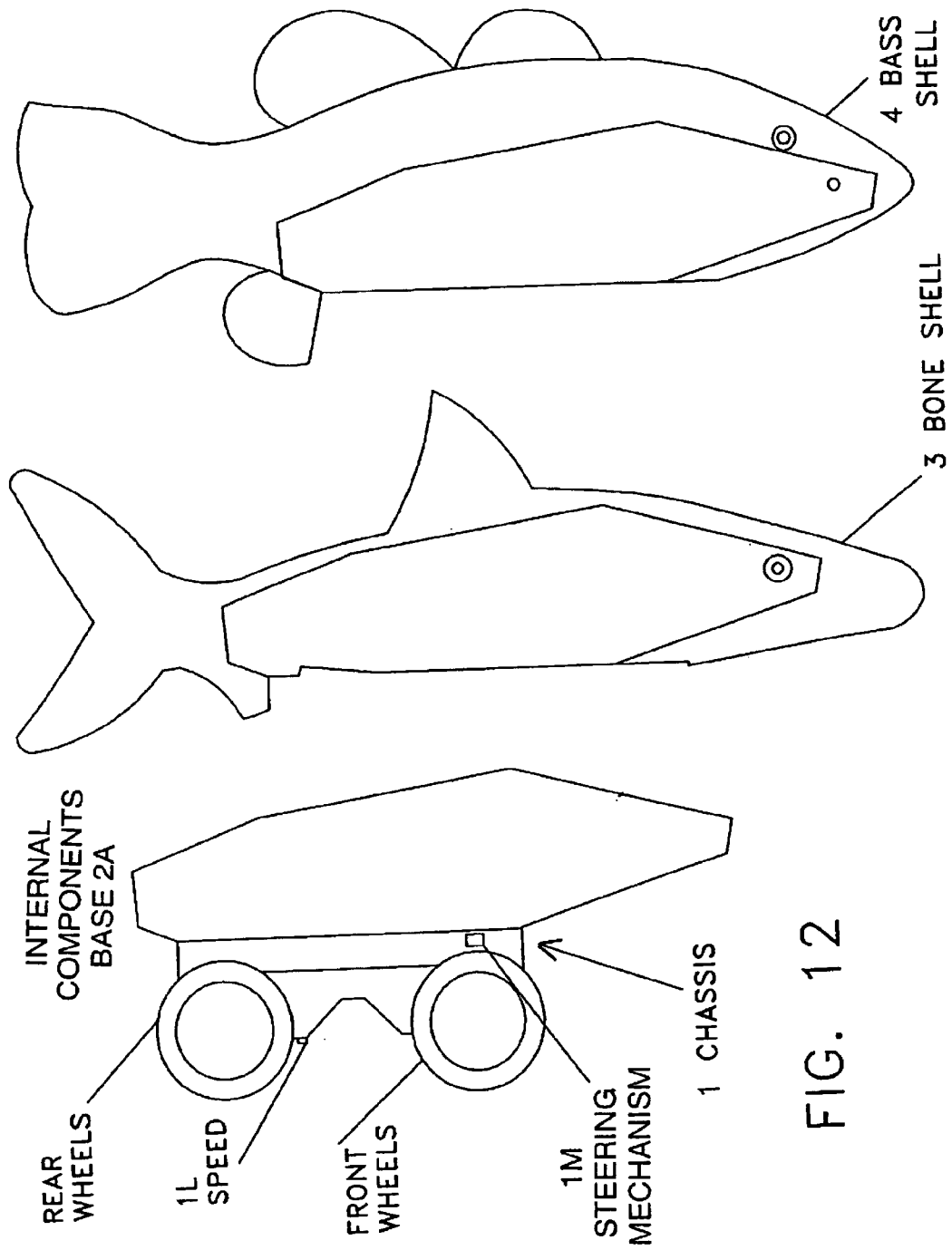
FIG. 12 shows a chassis and two shells of the present invention.

FIG. 12 provides a two-dimensional depiction of the chassis 1 and shells 3, 4. The two front wheels and two rear wheels of the chassis 1 consist of cast hard rubber tires with rims and all-terrain tread for optimal traction under all operating conditions. The wheels are attached to the chassis 1 via a spring suspension thereby assisting in providing smooth travel on uneven surfaces. The chassis 1 houses the internal components base 2A and provides support for the outer shells 3/4 which both protect the internal components and gives the invention its distinctive appearance. These outer shells 3/4 can come in several shapes, allowing fishermen to correlate the type of fish desired with the casting method typically used under normal fishing conditions. One such example of this occurs when the bass shell 4 is placed on the chassis 1 while the operator is casting the IR lure 6. Another example occurs when the bonefish shell 3 is used when the operator is casting the reflecting lure 5. However, other shells and body styles may also be employed. This completes the overview of the present invention. The specific components of the invention will now be described in more detail.

Chassis 1

Figure 13:
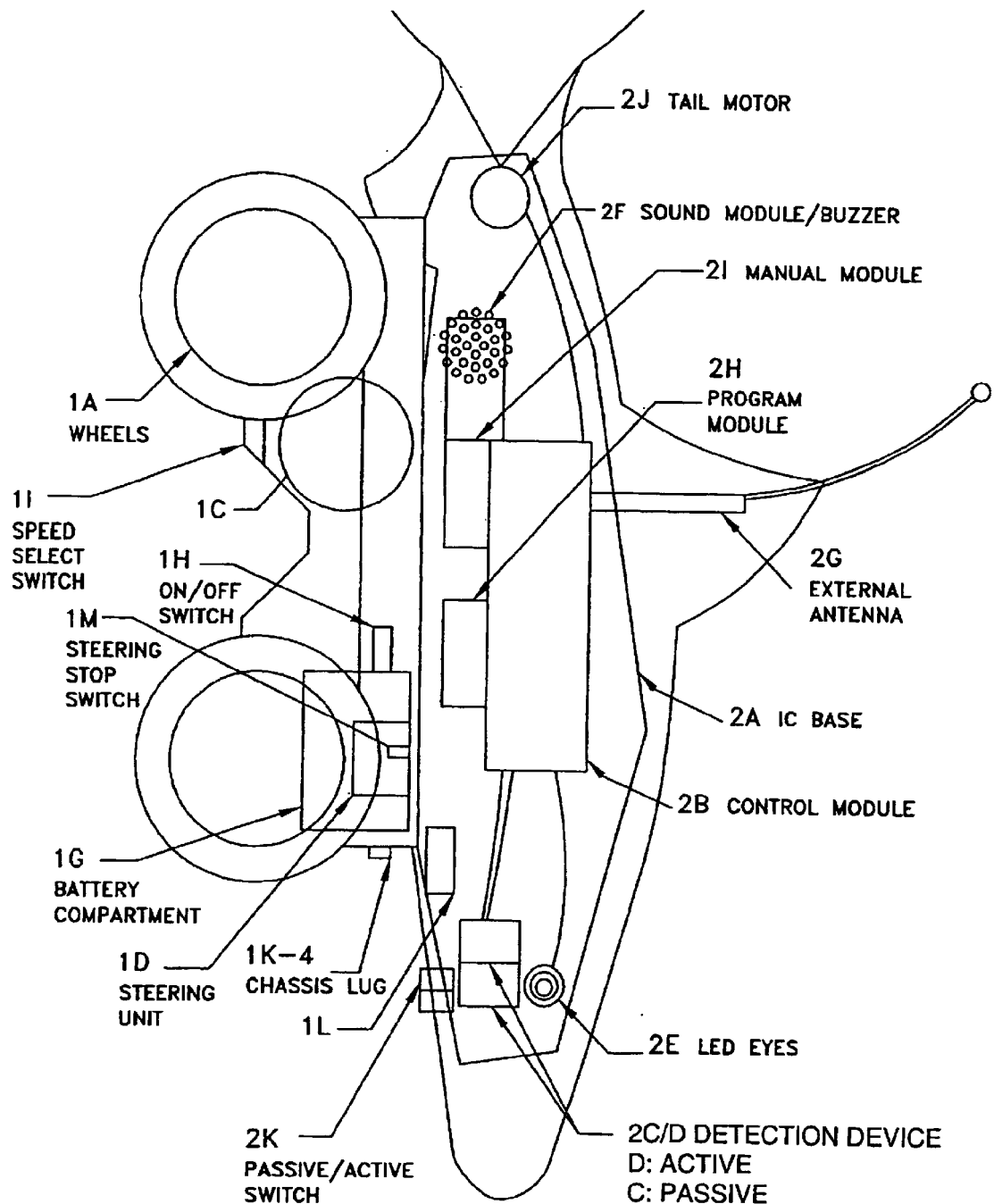
FIG. 13 shows a detailed horizontal view of the present invention.

FIG. 13 shows several of the internal components of the practice fish 100. The rear wheels are powered by a three speed geared DC drive motor 1C connected by a three speed, geared transmission with an external speed selection switch 1I. The front wheels are connected to a front wheel steering linkage 1D which enables the chassis 1 to be steered. A steering adjustment acts to hold the front wheels in correct alignment during turning. A steering solenoid allows steering to be controlled remotely via radio control. When not in remote control mode, a four position steering stop switch 1M is positioned on the chassis thereby allowing for an automated steering system.

The chassis 1 also includes a battery compartment 1G which houses the rechargeable battery that powers the practice fish 100. The on/off switch 1H to this power source is attached thereto. Moreover, a DC charge plug 1L is attached so that the battery may be recharged without removal from the chassis 1. The switch 2K enables an operator to choose between active and passive detection modes.

The internal components base 2A is attached to the top of the chassis 1. This base 2A acts as a mounting platform for the internal parts 2B–2K. The control module 2B is a radio receiver, which obtains its signal from an external antenna 2G allowing the practice fish 100 to receive controls from a remote control 7.

As shown in FIGS. 12, 13, 28A and 28B, the chassis 1 is made of cast plastic. The two rear wheels are connected to the motor 1C which responds to a radio control that allows the chassis 1 to be driven forward or in reverse by a radio controller 7. Selector switch 1I located on the bottom of transmission allows selection of three speeds: low, medium or high.

Figure 27:
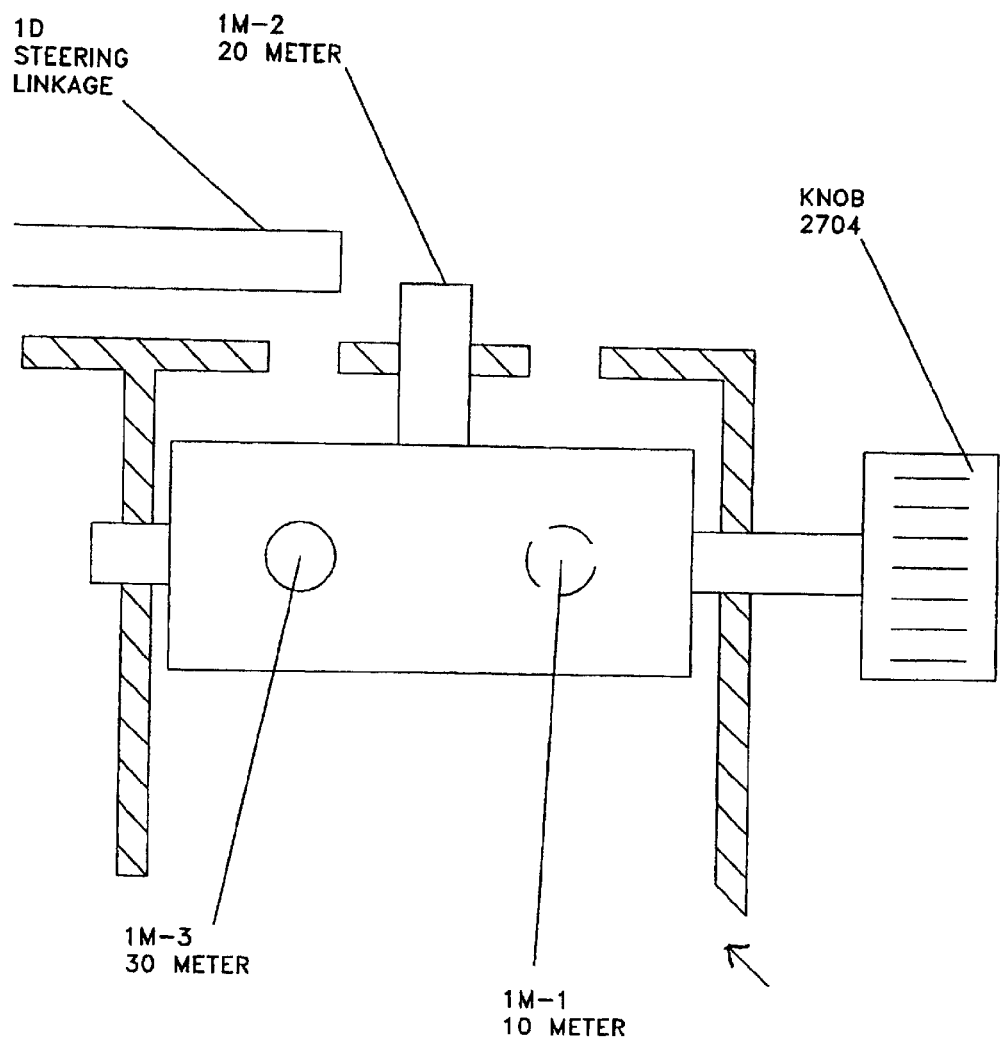
FIG. 27 shows the steering linkage of the present invention.

As shown in FIG. 27, a steering linkage 1D allows a solenoid to turn the front wheels to the right or left. Directly below this steering solenoid there is located a steering adjustment which allows for correct alignment of the front wheels.

Figure 28B:
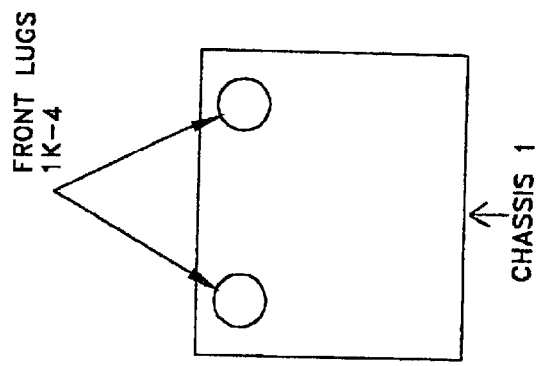
Figure 28A:
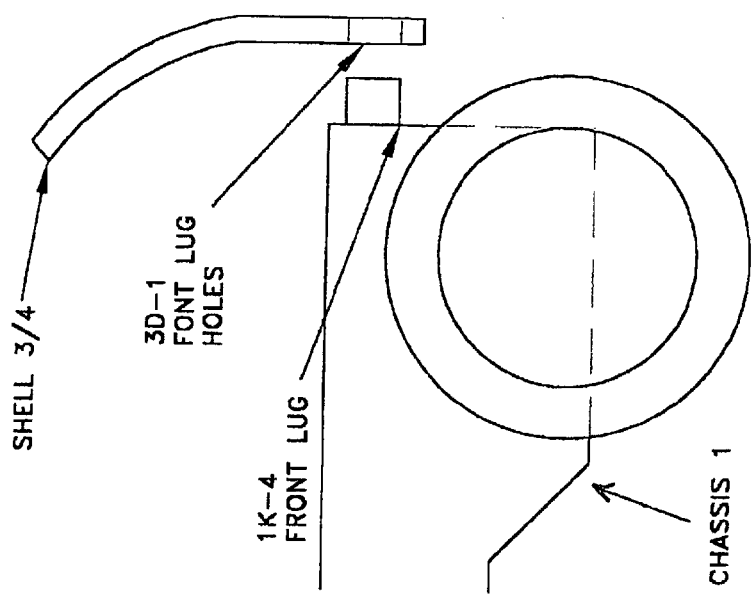

As shown in FIGS. 28A and 28B, located on the front surface of the chassis 1 are two protruding, round lugs 1K-4 onto which two corresponding round holes drilled into the shell 3/4 enter for the purpose of securing the front of the shell 3/4 onto the chassis 1. On the rear portion of the chassis 1 are two mounting detents 1K. These mounting detents 1K use a plastic detent button which is extended from the chassis 1 by a coil spring. These mounting detents 1K move slightly when the shell 3/4 is pressed down onto the chassis 1 and then extend outward into two holes 3D-1 to secure the rear of the shell 3/4 onto the chassis 1. These mounting detents may be depressed through the holes 3D-1 to allow removal of the shell 3/4 from the chassis 1 by lifting upwards when the detents are depressed and moving the shell 3/4 forward to disengage the round lugs 1K-4.

As shown in FIG. 27, located on the right side of chassis 1 is a steering mechanism 1M having a rotating cylinder with three projecting lugs 1M-1, 1M-2, and 1M-3 which correspond to turning radii of ten, twenty, and thirty meters. The steering stop 1M has an external indicator knob 2704 which a user can rotate to set steering into one of four positions: manual, ten, twenty, and thirty meter. When the indicator knob 2704 is rotated, it locks into the selected position and is held there by a small detent (not shown). In manual position, none of lugs 1M-1, 1M-2, or 1M-3 is raised above the bottom surface of the chassis 1 so nothing interferes with the free movement of steering linkage 1D. In positions ten, twenty, or thirty, a corresponding lug is raised above the chassis bottom 1 thereby forcing steering linkage 1D to stop at a given position when the steering solenoid is energized. This is primarily utilized during automatic loop and automatic circle programs.

As shown in FIG. 13, attached to the top of the chassis 1 is the internal components base 2A. The base 2A can be made of cast plastic, and acts as a mounting platform for the internal components 2B through 2J. The base 2A has recesses and cut outs which conform to the shape of each component to assist in stabilizing and mounting securely thereto. FIG. 13 also shows a control module 2B which is the radio receiver for communicating with the remote controller 7.

Lures 5/6

FIGS. 16 and 17 show the unweighted reflective lure 5 used in conjunction with the passive detection device 2C. The lure 5 contains a closed loop, stainless steel hook 5A-1 to prevent snags. The loop is narrowed at one end where it is coated with a plastic cast, or epoxy coated head 5A-2, upon which a prismatic or painted eye 5A-3 is attached. Covering the other end of the loop and extending beyond is a highly reflective detection material 5A-4 such as but not limited to mylar tinsel. Additionally, an operator could tie their own lure and then apply a reflective coating dip or spray thereto. Any of these solutions would be used to reflect the infrared light emitted by the passive detection device 2C back to the photo sensor 2C-1 signifying a detection event, and cause the practice fish 100 to enter into detected mode.

Conversely, the weighted IR lure 6 (FIGS. 18, 19) has lead dumbbell eyes which can be rubber coated or stainless or brass for durability. These are necessary because people fish with both weighted and unweighted flies which differ substantially in their casting requirements, so that training on both is essential.

FIGS. 18 and 19 are schematic diagrams of the IR lure 6 used in conjunction with the active detection device 2D. The plug 6 consists primarily of three external components. A stainless steel eye 6B is cast in an impact resistant, clear plastic, shell 6A so that the eye 6B is not detachable. A separate, screw-on plastic bottom 6C completes the external coverings of the plug 6. It is important that the external components of the IR lure 6 be durable, its internal components are designed to provide an intense infrared light source so that the photo sensor 2D-1 is appropriately triggered. To accomplish this, a small battery 6F is placed in a recessed battery compartment 6E at the upper extremity of the plastic bottom 6C. When this piece is screwed into the shell 6A, the battery 6F touches and powers a circuit board 6D. This circuit board 6D controls three light emitting diodes 6G causing them to emit pulses of high intensity infrared light which, if it reaches the photo sensor of the active detection device 2D, signifies a detection. The green LED 6H is to show that the IR lure 6 is still active and powered up, and that it hasn't been knocked out of order by a particularly hard cast.

Alternately, the entire IR lure 6 could also be cast in solid plastic with an internal rechargeable battery. Because such a device would not require disassembling and the resulting threaded or fitted parts, its durability would be enhanced. Such a feature would be especially useful when the present invention is used on hard paved surfaces.

Shells 3,4

FIGS. 14A and 14B show the basic structure for the bonefish shell 3. FIG. 14A shows the bonefish shell 3 from a top-view and its constituent tail assembly 3F, tail pivot 3G, and antenna hole 3H. FIG. 14B shows the bonefish shell 3 from a side view along with the chassis 1 upon which it is to be attached. The detent 1K-1 of the chassis 1 fits into the hole 3D for detent 1K-1 when the fish is assembled while the front lug 1K-4 fits into the lug hole 3D-1. The speaker port 31 allows sound to easily permeate the shell 3. The antenna hole 3H similarly provides an escape route for the antenna 2G. Moreover, the eye opening 3E allows light to escape when emitted by the LED eyes 2E. The detection system, including active Ports 3B and 3C are cut into the shell 3 for passive detection module 2C and active detection module 2D, repectively.

FIGS. 15A and 15B show the basic structure for the bass shell 4, including the tail assembly 4F, tail pivot 4G, and antenna hole 4H. FIG. 15B shows the bass shell 4 from a side-view along with the chassis 1 upon which it is to be attached. Like the bone fish shell 3, the detent 1K-1 of the chassis 1 fits into the detent hole 4B when the fish is assembled while the front lug 1K-4 fits into the lug hole 4D-1.

The bone fish shell 3 and bass fish shell 4 can be constructed of fiberglass cloth and polyester resin, although the present invention should not be considered as limited thereto. FIGS. 14A–B will now be described with respect to the bone fish shell 3, although essentially the same details pertain to FIGS. 15A–B and the bass fish shell 4. It is important to note that other shapes could also be implemented within the spirit and scope of the present invention, and that FIGS. 12, 14A–B, and 15A–B are for exemplary purposes only.

The bone fish shell 3 has two eye lenses 3E in its upper front surface. These lenses 3E are clear plastic, domed on their upper surface, and snap into place in a hole through the shell to allow light from LEDs 2E to shine through. These LEDs 2E are attached to both sides of the internal component base 2A, and are intended to resemble the eyes of a fish. Accordingly, the LEDs 2E are programmed to flash periodically when the practice fish 100 is in seeking mode and glow brightly for a short period after a lure is detected. Similarly, a sound module/buzzer 2F is programmed to emit no sound while the practice fish 100 is in seeking mode, but once a lure is detected to emit a high-pitched buzzing noise for five seconds. The shell 3 also has in its lower rear portion a through hole on each side 3B which allows detent 1K to engage in order to securely hold the shell 3 in place.

Passive Detection Mode

Figure 23:
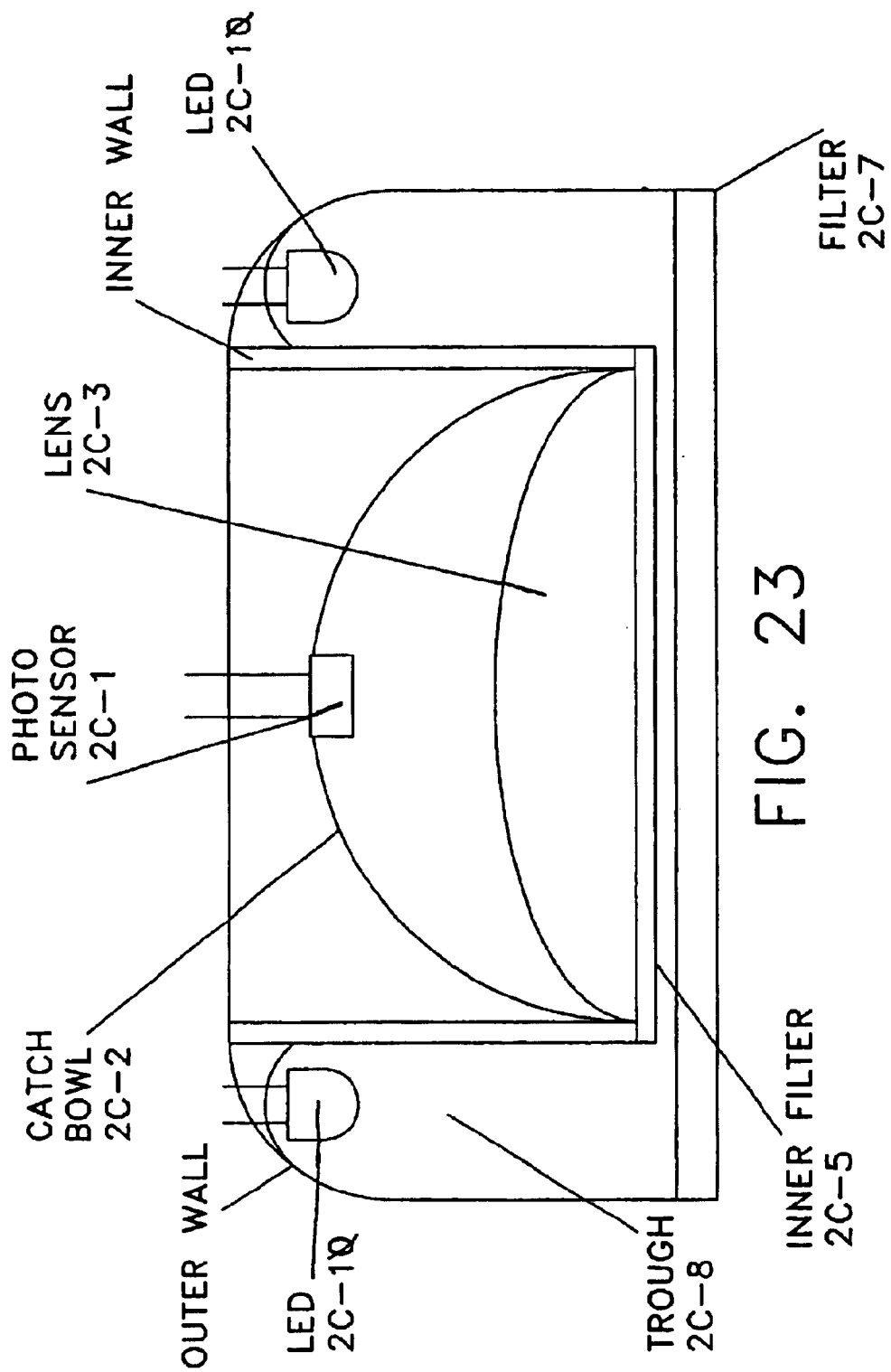
FIGS. 23–24 show details of the passive detection system of the present invention.
Figure 24:
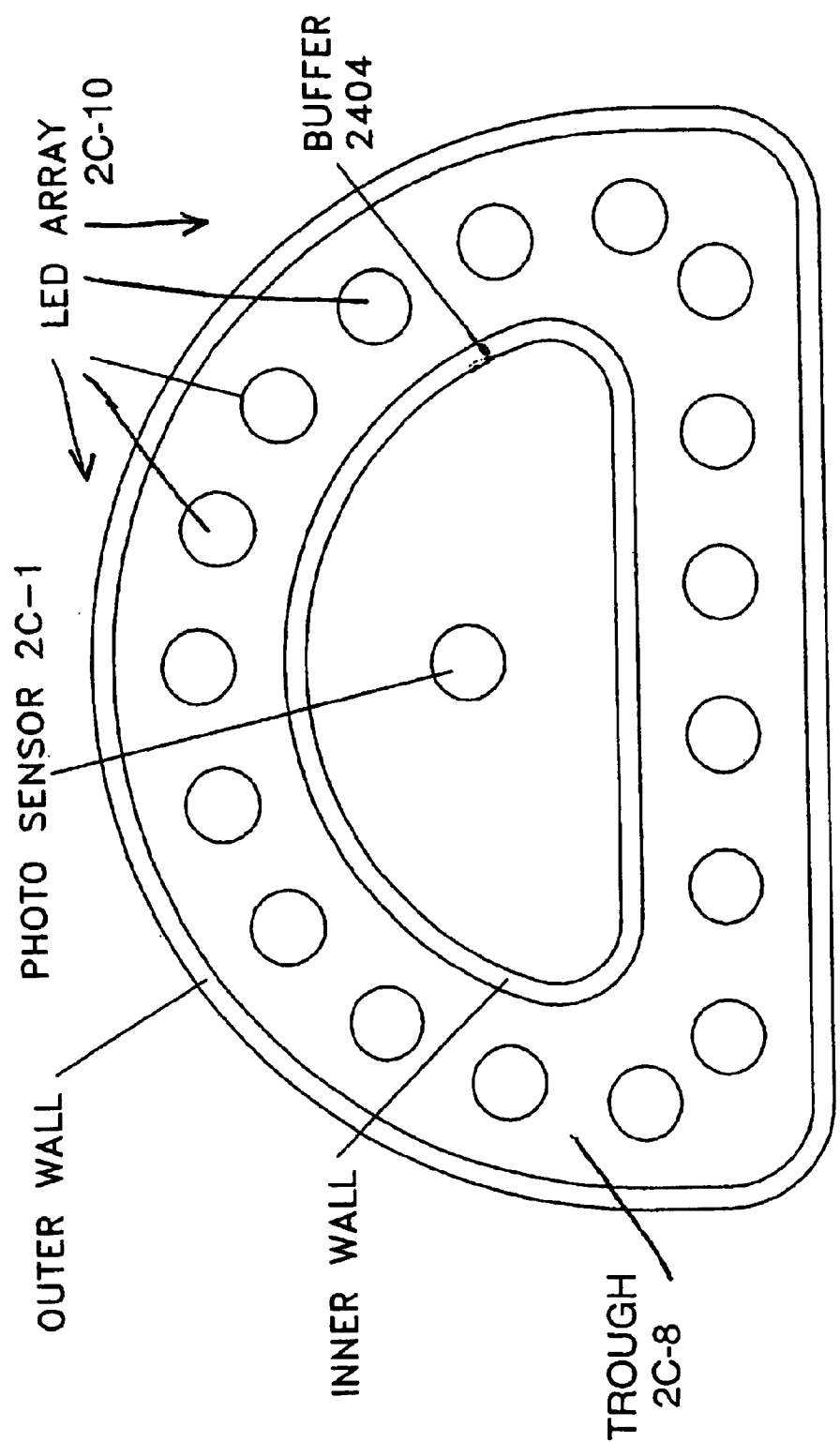

As stated, two alternative devices for detecting the lure 5/6 exist, a passive detection device 2C and an active detection device 2D. As shown in FIGS. 23–24, a passive detection device 2C uses an array of infrared light emitting diodes 2C-10 surrounding a photo sensor 2C-1 to allow for detection of a lure that reflects the emitted infrared light back to the photo sensor 2C-1. Also as shown in FIGS. 23–24, the passive detection system 2C utilizes the same photo sensor and lens as the active detection system 20. The passive system 2C differs from the active system 2D in that it also includes an array of infrared LEDs around the perimeter of the photo sensor 2C-1. These LEDs are shielded from the photo sensor by a buffer wall 2404 preventing accidental signaling. The trough 2C-8 in which the LEDs are placed is coated on its interior with a highly reflective mirroring surface. Also, the outer wall of the trough 2C-8 is slightly higher than the inner wall, thereby eliminating any blind spot at the center of the ring of projected infrared light. When in contact with a power source, the array of LEDs 2C-10 will emit infrared light that will be directed to the ground immediately in front of the fish. The reflecting lure 5 used in conjunction with the passive detection system 2C contains a highly reflective, prismatic surface capable of reflecting the infrared light emitted by the LEDs 2C-10 back to the photo sensor 2C-1.

As shown in FIG. 7, a concentrating lens 2C-3 located between the photo sensor 2C-1 and the overall ambient light filter 2C-7 concentrates the reflected, infrared light beyond the threshold level necessary to trigger a response from the photo sensor 2C-1. This response will be sent to the control module 2B which then signals all other electrical components of the fish to begin the detection cycle. A mirrored collector recess (catch-bowl) 2C-2 is located around the photo sensor 2C-1. There is a potential problem that emitted light from the group of LEDs 2C-10 could trigger the photo sensor 2C-1. To prevent this, the photo sensor 2C-1 is located in a catch-bowl 2C-2 where a filter 2C-5 protects the photo sensor 2C-1 from being tripped accidentally by emitted light instead of reflected light. The catch bowl 2C-2 and filter 2C-5 also assist in isolating reflected light from ambient light that also may cause a false trigger. The rear surface of the concentrating lens 2C-3 is coated with a 1-way mirrored coating.

Spin cast fishing and bait casting allow a heavy plug to be utilized. Thus, the size and weight of this plug makes active detection possible. When fly casting however, weight and size are very critical factors. To compensate for this, the reflecting lure 5 is tied with a highly reflective material to keep it light weight and more realistically castable. Sensitivity in the passive mode is critical due to the loss of strength caused by distance and refraction vectors.

The passive system 2C differs from the active system 2D in that it includes an array of infrared LEDs 2C-10 around the perimeter of the photo sensor. As shown in FIG. 24, these LEDs 2C-10 are shielded from the photo sensor by a buffer wall 2404 preventing accidental signaling. The trough in which the LEDs are placed is coated on its interior with a highly reflective, mirror type surface.

FIG. 23 further illustrates that the outer wall of the LED trough 2C-8 is slightly higher than the inner wall, thereby allowing the ring of projected infrared light to be focused and to have no blind spot at its center. When in contact with a power source, the array of LEDs will emit infrared light that will be directed to the ground immediately in front of the practice fish 100.

To be effective, the photo sensor 2C-1 must overcome and sort two detection problems. The first is constant interference from sunlight, which can be the slowest part of the light stream to change. However, the sunlight intensity can change in a wide range and can exceed that of other components. The second light component to continually cause problems is an ambient background due to artificial light. Large fluctuations in the magnitude of the artificial light can be present. Furthermore, the artificial light can contain a significant variable component having double the supply power frequency i.e., 100–120 Hz. The only desired component to be detected are light impulses of 1kHz frequency with a pulse length of 10–15 microseconds, thus falling within the infrared IR spectrum. The present invention seeks to detect these impulses and only these impulses in all light and atmospheric conditions and types of reflecting surfaces.

To achieve this goal, the reflecting lure 5 used in conjunction with the passive detection system 2C contains a highly reflective, prismatic surface capable of reflecting the infrared light emitted by the diodes back to the photo sensor. A concentrating lens 2C-3 placed between the photo sensor 2C-1 and the ambient light filter 2C-7 focuses the desired reflected infrared light beyond the threshold level necessary to trigger a response from the photo sensor 2C-1. This response, identical to that occurring within the active detection system 2D, is sent to the control module 2B which then signals all other electrical components of the practice fish 100 to transition in detected mode thereby beginning the detection cycle. High sensitivity and wide angle of detection area without using any type of extra lenses can be provided due to the large surface area of receiving surface of the photo sensor 2C-1.

Active Detection Mode

Figure 25:
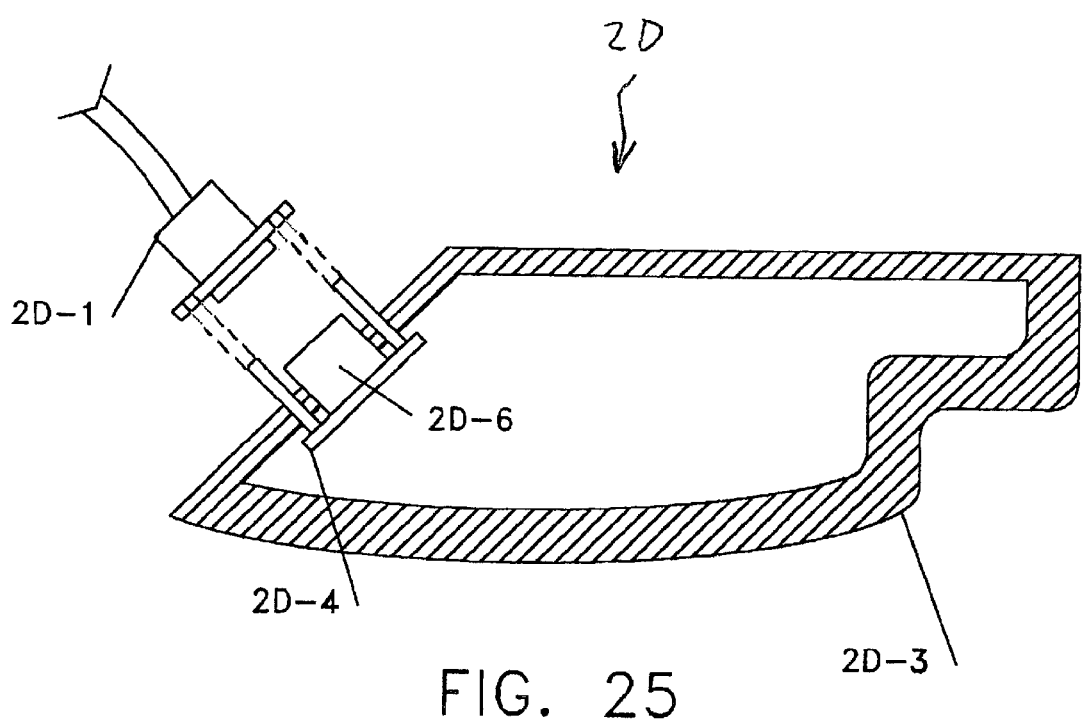
FIG. 25 shows details of the active detection system of the present invention.

FIG. 25 shows the active detection device 2D. The active detection device 2D is similar to the passive detection device 2C except that the active detection device 2D does not contain an array of infrared lights 2C-10 and does not have a concentrating lens 2C-3. Instead, the IR lure 6 (FIGS. 18, 19, 26) emits IR light pulses to the active detection device 2D, rather than using reflected light. In FIG. 25, a photo sensor 2D-1 rests on a sensor holder 2D-6, which is surrounded by an ambient light filter 2D-3. An additional light filter 2D-4 ensures that the photo sensor 2D-1 is not falsely triggered.

Figure 26:
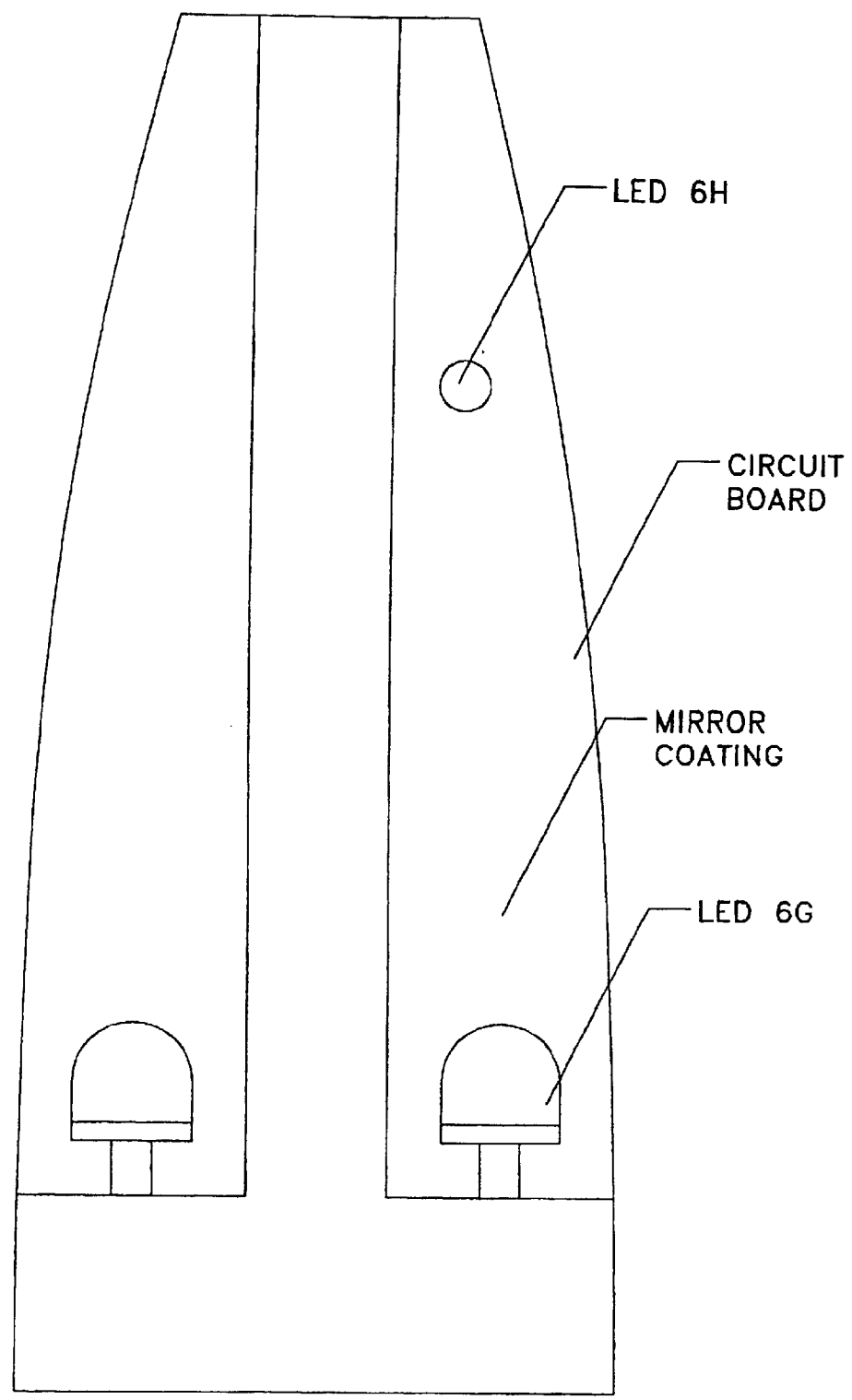
FIG. 26 shows an additional view of the IR lure of FIGS. 18 and 19.

As shown in FIGS. 18, 19, and 26, the IR lure 6 used in conjunction with the active system is comprised of a clear plastic shell 6A containing three very strong infrared LEDs 6G, which are connected to a small circuit board that is powered by a small battery. As soon as the IR lure 6 is assembled, the three LEDs emit strong pulses of infrared light which is amplified by a mirror coating on the outside surface of the body of the IR lure 6. When the IR lure 6 is cast near the head of the practice fish 100 or in its detection zone 108 (FIGS. 1–6), the photo sensor 2D-1 detects the presence of the infrared light pulses emitted by the IR lure 6 thereby causing an electrical signal to be sent to the control module 2B, which then signals the other electrical components triggering the fish to begin its detection cycle.

Figure 6:
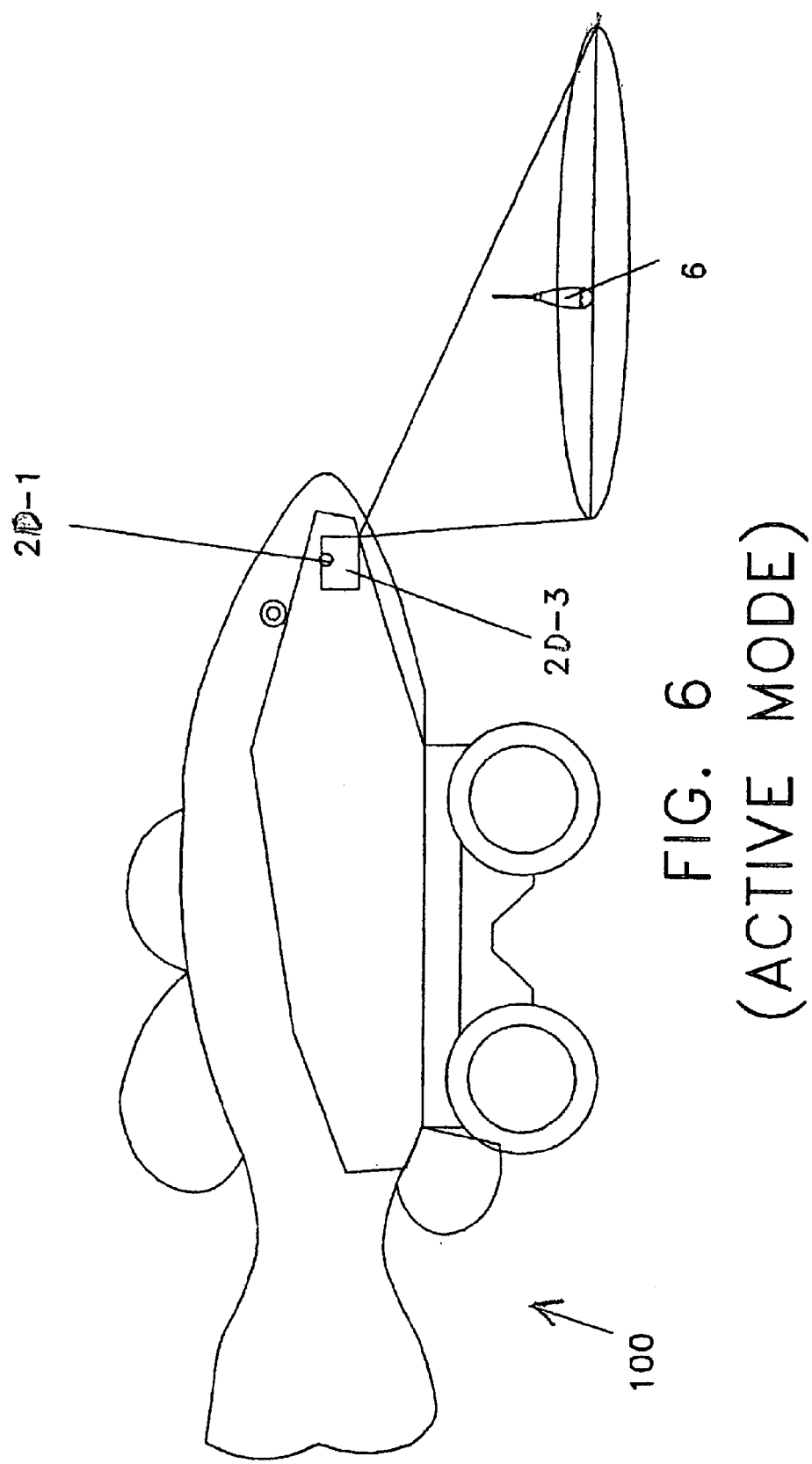
FIG. 6 shows the present invention in active mode.

As shown in FIG. 6 (with proportions exaggerated), the practice fish 100 carries in its nose a photo sensor 2D-1 approximately the size of a quarter. When electrical power is provided and the practice fish 100 is set in active detection mode using the switch 2K (FIG. 13), the circuit board and photo sensor 2D-1 will search for impulses of infrared light. To avoid false detections, the intensity of this infrared light must meet a certain threshold level before the detection is made. Also, an ambient light filter 2D-3 attenuates unwanted light signals.

Negative Feedback Mode

An alternative mode includes a mechanism for triggering negative feedback from the practice fish 100 when an operator makes a casting error. This mode would be neither seeking mode nor detected mode, but instead a negative feedback mode. Such a mode could be triggered by, for example, the operator hitting the practice fish 100 with the lure 5/6. The practice fish 100 could be programmed to enter negative feedback mode in which it says "ouch" and or do something negative like skit away, not enter detected mode, and/or not return to seeking mode for 30 seconds or some other period.

Sound Module

As shown in FIG. 13, the sound module 2F consists of an audio playback unit attached to two speakers (not shown). The speakers align with holes 3I/4I (FIGS. 14B, 15B) in the shell 3, 4 so that audio sound may be transmitted from the speaker Inside the shell 3, 4 to the surrounding area. The audio playback unit will have a prerecorded audio noise on a five second loop. During detection, the audio unit will be instructed by the control module 2B to play the five second audio loop. The prerecorded audio noise will be similar to that of the sound of a fishing reel's drag when line is being stripped off of the reel at a high rate of speed. An electrical audio buzzer which emits a similar noise can be substituted for an audio playback unit.

External Antenna 2G

FIG. 13 also shows the external antenna 2G, which is electrically connected to control module 2B and receives the series of transmitted signal from the controller 7. The stainless steel wire antenna 2G has a coiled area at its base to help absorb shock and prevent breakage. The tip of the antenna 2G has a plastic protective ball to protect the tip from causing an accidental puncture. Alternatively, a non-protruding internal antenna could also be used.

Module for Programs 2H

A module for program modes 2H allows a pre-programmed path way in which the practice fish 100 will travel. Module 2H allows a radio transmitted signal from the display for program 7K to activate a micro-circuit which operates automatically rear wheel drive unit 1C and front wheel steering unit 1D.

Two modules attached beneath the main control module 2B provide alternative sources of control for the fish. The module for program modes 2H is mounted towards the front base of the control module 2B, governs the motion of the fish while in any of its programmed routes. The module for manual mode 2I, mounted towards the rear base of the control module 2B and governs the motion of the fish while it is under manual radio control. The module 2H could also include additional memory and processing features thereby extending its ability to set up routes more complex than circles or loops, according to operator preferences.

Tail Motor Assembly 2J

Figure 11B:
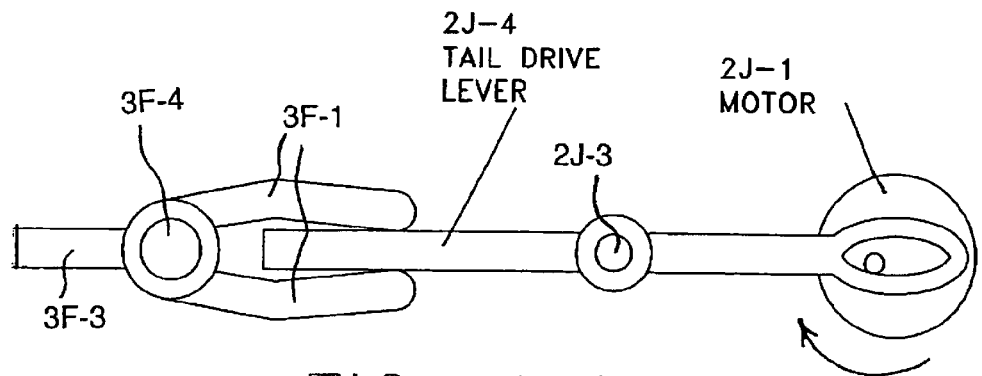
FIGS. 11A and 11B shows tail motor assembly of the present invention.
Figure 11A:
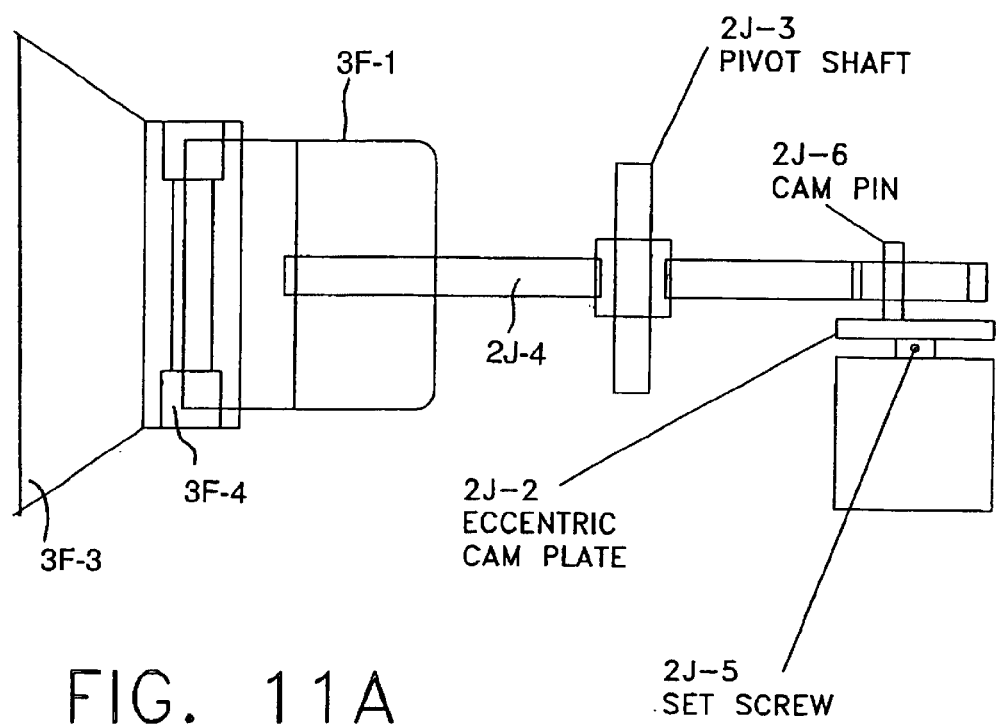

As shown in FIGS. 11A and 11B, a tail motor assembly 2J allows rotary motion from a motor 2J-1 to be transferred to tail drive lever 2J-4 (also known as a pivot arm) which is made of plastic. Both shells 3, 4 have at their rear end a pivoting tail mechanism in which the tail drive lever 2J-4 engages the flexible plastic fingers 3F-1. The cam plate 2J-2 is made of cast aluminum alloy, attached by a set screw 2J-5, and driven by a motor 2J-1 which turns the upright cam pin of 2J-6 thereby causing the tail drive lever 2J-4 to move back and forth on stainless pivot pin 2J-3. The motor 2J-1 can move for example at one rpm per second, although other rates are possible. The signal from the control module 2B causes the motor 2J-1 to activate a moving part 2J-4 which rests in the fork of the tail mechanism. The tail portion 3F-3 is a flexible, plastic, tail shaped blade. The activation of motor 2J-1 transfers motion through pivot point 2J-3 and pins 3F-4 to the tail 3F-3 resulting in its oscillating back and forth thereby creating the appearance of a swimming motion.

Remote Controller 7

Figure 20:
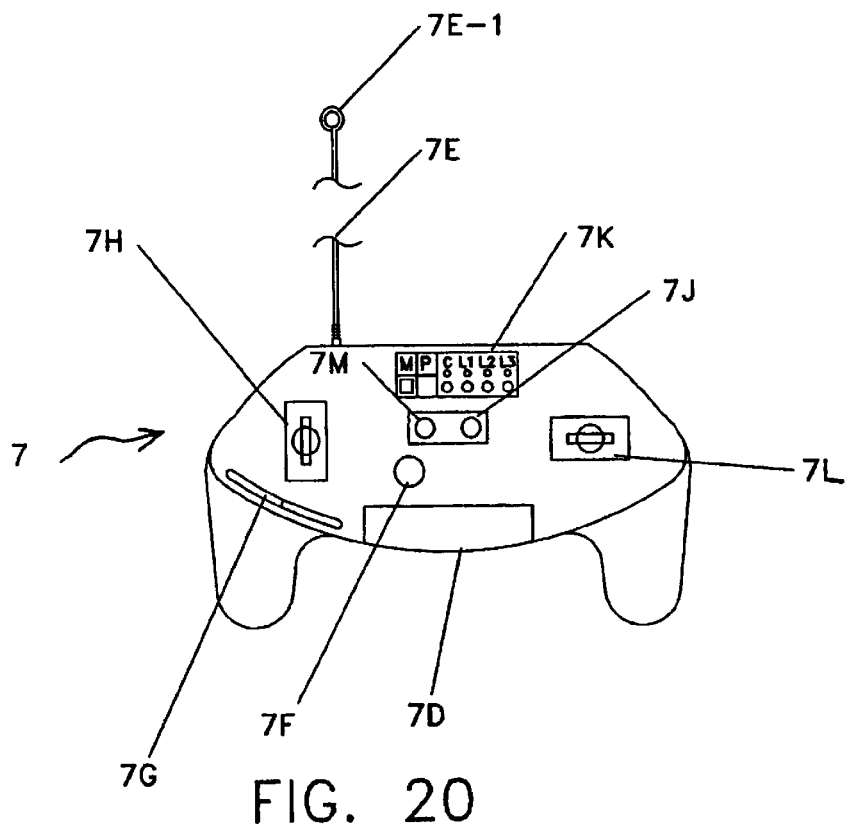
FIGS. 20–22 show the remote controller module of the present invention.
Figure 21:
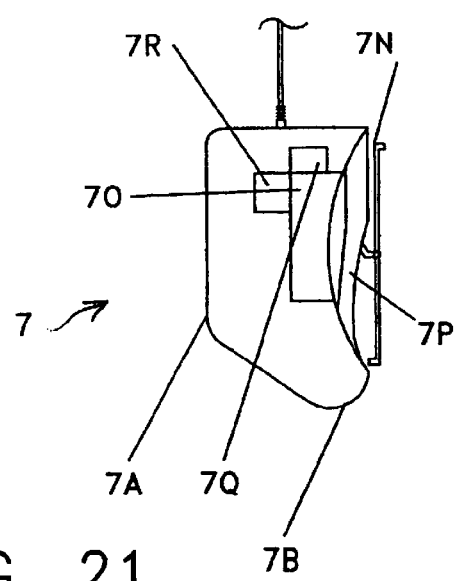
Figure 22:
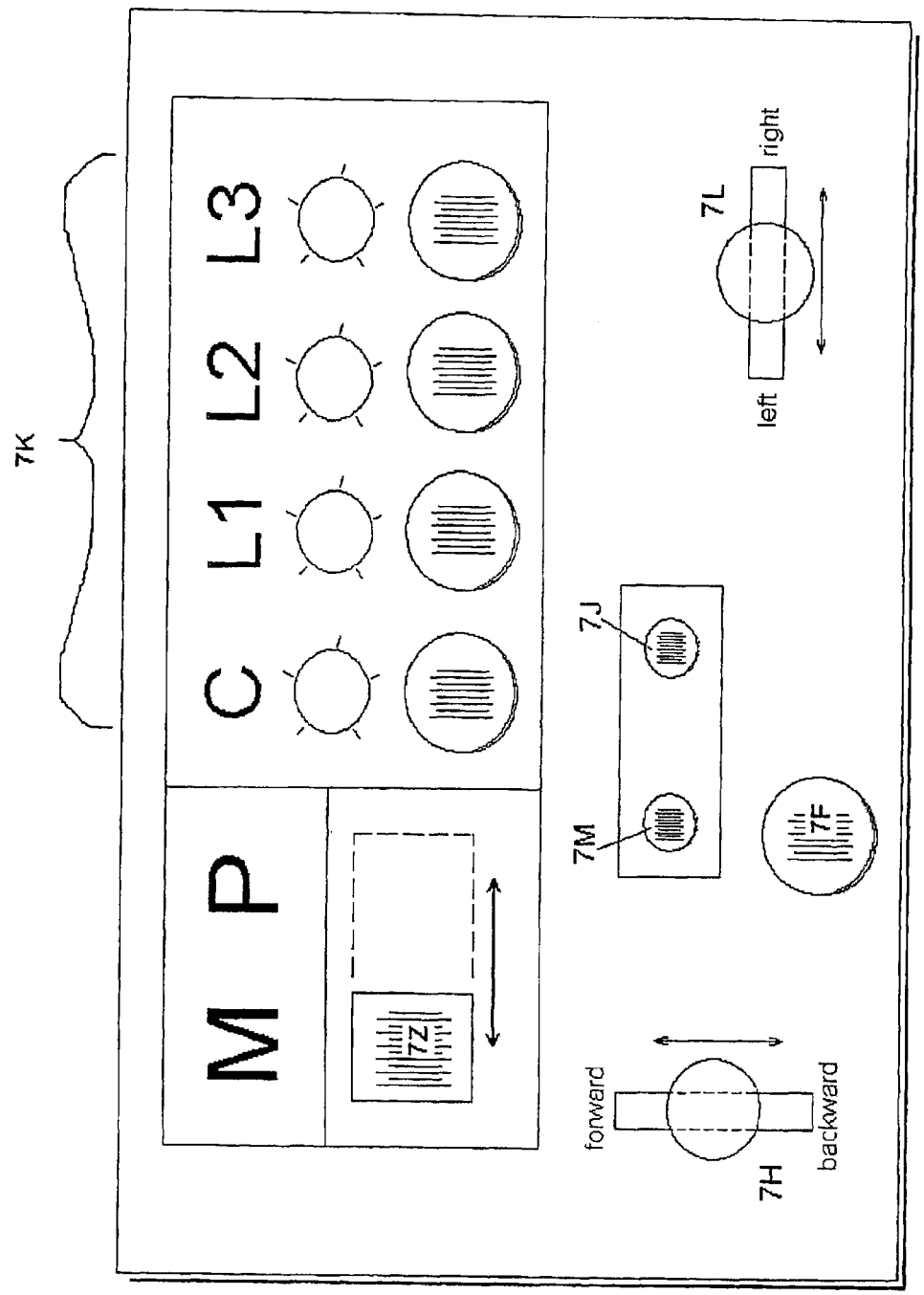

FIGS. 20, 21, and 22 show an exemplary embodiment of the remote controller 7. It is important to note that FIGS. 20, 21, and 22 are but one possible way of achieving a remote controller 7, and that alternate embodiments are contemplated within the spirit and scope of the present invention. The following description will describe the remote controller 7 as communicating by radio, but other communications means could also be used, including but not limited to WiFi. The radio controller upper half 7A and lower half 7B with belt clip 7N combine to form an assembly which is made of cast plastic with various openings, recesses, and cutouts for components 7E through 7R. The controller 7 is powered by a battery 7D which fits into battery compartment 7O where it engages a positive and negative terminal when pressed into its resting position. The battery compartment 7O is then closed by snapping battery compartment 7P into position.

The controller 7 has an antenna 7E approximately 6 inches long made of stainless steel wire with a coiled area at the base to minimize breakage. The controller has on the upper display surface a battery power display 7G (FIG. 20). The display 7G shows the power level of battery 7D by lighting a red and green strip to show remaining power level of battery 7D. The display 7G is activated by depressing power display button and will only be energized to display when button is depressed and held.

The controller 7 also has on its upper display surface an emergency stop button 7F (FIG. 22) which, when depressed will signal the fish vehicle so that all motion whether manual or program will immediately stop. Once the stop button 7F is pushed, it locks into a down locked position and must be rotated one half turn to the left, to cause it to spring up and be reset.

The controller 7 has a forward and reverse toggle button 7H on its upper display surface, with center rest position for neutral. The toggle button 7H allows the operator to use the left thumb to drive the practice fish 100 in manual mode, forward and backwards by remote transmitter 7Q which transmits signals from components 7F, 7H, 7L, 7J, and 7M. Additionally, the controller 7 also has a right and left toggle button 7L on its upper display surface with center rest position for straight. The button 7L allows the operator in manual mode to use the right thumb to control the right and left steering motion of the fish vehicle by activating transmitter 7Q.

An abbreviated view of portions of the remote controller 7 is shown in FIG. 22, in which the program start and stop buttons 7M, 7J transition the remote device 7 in and out of program mode. The button 7M activates the program shown on display 7K. The button 7J stops the program displayed on the display 7K. By lighting an LED directly above each of the buttons associated with C, L1, L2, or L3, the display 7K indicates when the practice fish 100 is in circle mode or one of the three loop modes. When the button 7Z has been moved from Manual position (left) to Program position (right) as symbolized by the large M and P in FIG. 22, the buttons and LEDs on the right side of switch 7Z may be activated. By pressing the button below a program such as C, L1, L2, or L3, that program's indicator LED will light. For example, depressing program start button 7M will then start the automatic program selected on display 7K. Like with radio buttons, only one automatic program may be selected at any given time, but one button will always be selected. The program controller 7R will relay to remote transmitter 7Q a prerecorded series of directions which will cause the practice fish 100 to move in the circle or loop which has been selected on the display 7K. This automatic program is started by the button 7M and stopped by the button 7J.

As stated, there are other variations of the controller 7 possible within the present invention, including an expanded control panel in which more complex movements and routes can be set up and then downloaded to the practice fish 100. Thus, the remote controller 7 described above is but one possible implementation for controlling the practice fish 100. Other ways of controlling are also envisioned, including but not limited to a laptop computer or handheld Palm™ device. In an alternative embodiment, a hands-free voice-activated controller 7 is contemplated.

Manual Control Mode

The manual control mode is achieved by pushing the switch 7Z to its leftmost position directly under the letter 'M' in FIG. 22. Manual control allows for moving the practice fish 100 in a path determined by the operator. For manual control mode, the chassis 1 needs to have the steering mechanism 1M set to the 'off' or 'manual' position. At first usage, the speed select switch 1I (FIG. 13) should be set for low speed. The medium or high speed may be used later as the operator's skill level with the controller 7 develops. The radio receiver in the practice fish 100 receives the radio signals and transmits them to the drive motor 1C and the steering mechanism 1M.

Circle Mode

The circle mode is obtained by sliding the switch 7Z (FIG. 22) to its rightmost position thereby placing it in 'program' mode, and then pushing the button under 'circle' mode C.

Being sure the practice fish 100 is in an open area of at least the diameter selected by the operator will ensure that it has adequate space to execute the automatic circular path about to be started. When the operator is ready, pressing switch 7M (program start) will cause the practice fish 100 to move in a circular path clockwise. It will continue in the circular path in seeking mode until one of the following occurs: detected mode occurs; pressing button 7J (stop program); or pressing the emergency stop button 7F. If the practice fish 100 is stopped by the activation of a detection cycle, when the five second detection cycle is finished, the fish vehicle will continue on its automatic circular path. If, by pressing program stop 7J, the fish vehicle has been stopped during circle mode, the vehicle will remain motionless until program start button 7M is pressed or a different program is selected.

As shown in FIG. 27, the steering solenoid 1M has four positions which are: off, ten meter, twenty meter, and thirty meter. The solenoid 1M has an external knob 2704 which allows the operator to select one of the previously mentioned selections. Alternatively, the knob 2704 can be replaced with a motorized mechanism operated by the remote controller 7. Rotating the solenoid 1M causes a series of raised lugs 1M-1, 1M-2, and 1M-3 to be rotated and locked into a position, so that the steering linkage 1D strikes one of the raised lugs thereby causing the front wheels to be held in such a way that they cause a given diameter radius to be traveled. In manual mode, no lug is raised above the surface of the chassis 1, so that the steering linkage 1D is free to operate at its maximum range of movement. As shown in FIG. 27, when the knob 2704 has been turned to one of the other settings, the steering linkage 1D will strike the steering solenoid 1M. Holding the steering mechanism 1M in a given position and activating the DC drive motor 1C will allow the practice fish 100 to travel in a circle.

Loop Mode

In order to execute the loop program, an operator must begin by setting the on/off switch 1H (FIG. 13) to the 'on' position and then set the speed switch 1I to the slow position. For a ten meter loop, it is necessary to set the steering/stop switch 1M (located on the chassis 1) to the 1M-1 position. Turning to the remote control 7, the operator can then set the switch 7M to its rightmost position under the letter P (for Program mode), which enables pressing of an on/off button below the selected loop program L1, L2, or L3. Pressing any of L1, L2, or L3 buttons will light the corresponding green indicator LEDs located directly above that button. Supposing the operator pressed the L1 button, the practice fish 100 and remote controller 7 would then be ready to execute a ten meter loop mode program. The operator should place the practice fish 100 on a large, level, open area in order to allow adequate space for movement.

The operator may then press the button 7M in order to begin the loop path. The practice fish 100 will travel in one half of a ten meter circle going clockwise from its starting position, will then travel in a straight line from that tangent point for ten meters, will then execute another ten meter half circle, then travel in a straight line for ten meters, finally returning to its starting position. Thus, the loop will be a continuous motion. The practice fish 100 will continue moving in this manner until one of three things occur: a detection cycle, stop program button 7J, or emergency stop button 7F. These three interactions are exactly the same as in circle mode. Loop program two and loop program three, when selected from panel 7K (FIG. 22), operate in exactly the same manner as loop program one, except the straight drive distances are twenty meters for loop program two and thirty meters for loop program three. This allows three loops of ten meters in width, with three different lengths.

Timers (FIGS. 31, 32) inside the fish vehicle's control module 2B will allow a loop to be generated as follows: the loop begins with drive motor 2C rotating the steering mechanism 1M forward thereby stopping the steering linkage at the ten meter radius setting. These positions are held by the timer until the practice fish 100 has formed one half of a ten meter diameter circle. At that time, the controller 2B returns the steering linkage to its center, rest position. This will allow the practice fish 100 vehicle to travel forward from the tangent point of the half circle. This will continue until the practice fish 100 has traveled the distance timed by the timer. The fish vehicle will then execute another clockwise one half circle, then another timed, straight drive distance. This process of engaging the drive motor continuously, and alternating locking the steering linkage to the right, or straight for timed periods, will generate a series of loops of a given width and length.

Seeking Mode

During seeking mode, either passive detection module 2C or active detection module 2D will have been selected using switch 2K located on the front portion of I.C. base 2A, thereby utilizing either reflective lure 5 or IR lure 6. Thus, when the switch 1H is turned to the "on" position, one of the detection modules 2C or 2D is activated. Regardless of which, while the switch 1H is in the "n" position, the practice fish 100 defaults to seeking mode. During the seeking mode, the following occur:

LED eyes 2E are flashing once per second, tail mechanism 3F is being driven by tail motor 2J so that it moves back and forth in a swimming motion, completing a back and forth cycle every 1.5 seconds Sound module 2F is silent Detection devices 2C or 2D are actively seeking for the lure 5/6, regardless of whether the practice fish 100 is stationary, being driven in manual mode, operating in circle mode, or operating in loop mode.

Detected Mode

When the practice fish 100 has been in seeking mode and comes within range of the lure 5/6, as stated either the active detection module 2D or passive detection module 2C will activate, but never both. During a detection cycle the following will occur simultaneously:

all power will be cut to drive motor 1C, bringing the vehicle to a sudden stop if it has previously been moving LED eyes 2E will glow brightly for five seconds sound module 2F will emit through its two speakers a shrill high pitched buzzing sound for five seconds power will be cut to tail motor 2J, thereby stopping its movement The detection cycle lasts for five seconds, which is timed through control module 2B. Once a detection cycle has been completed, all systems will automatically go back to seeking mode. Although not shown, the present invention also contemplates a tracking and display mechanism for showing how many casts have been made and how many resulted in a transformation from seeking to detected mode, in other words a successful cast. Such statistics could be relayed from the practice fish 100 to the remote controller 7 and displayed on the front panel of the remote controller 7 or some other scorekeeping device. This is relevant because it is contemplated that the present invention could be employed in fishing contests, dueling casts, and other forms of entertainment and exhibitions.

If the practice fish 100 has been executing a programmed path, it will continue on that previously designated path. While the practice fish 100 is in seeking mode, it is capable of detecting the lure 5/6 and execute a detection cycle. This is true whether the practice fish is in stationary, manual, automatic circle, or automatic loop modes.

Electrical Features

Figure 29:
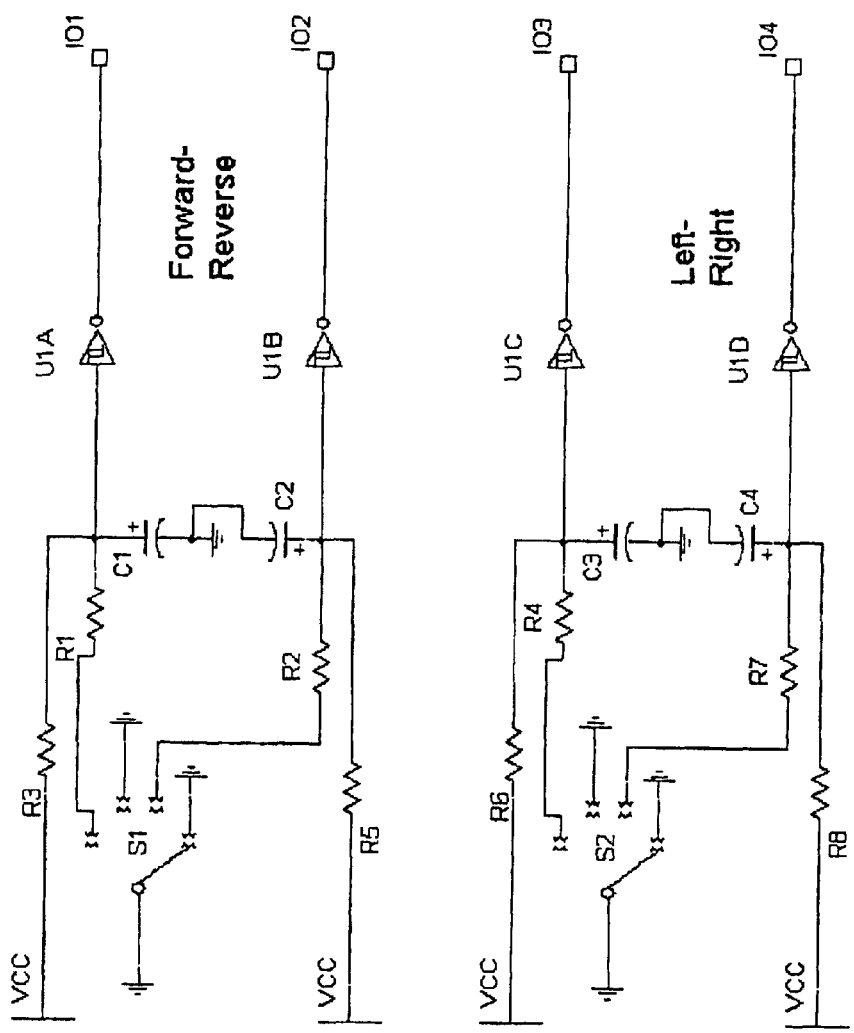
FIGS. 29–32 signal conditioning blocks of the present invention.
Figure 30:
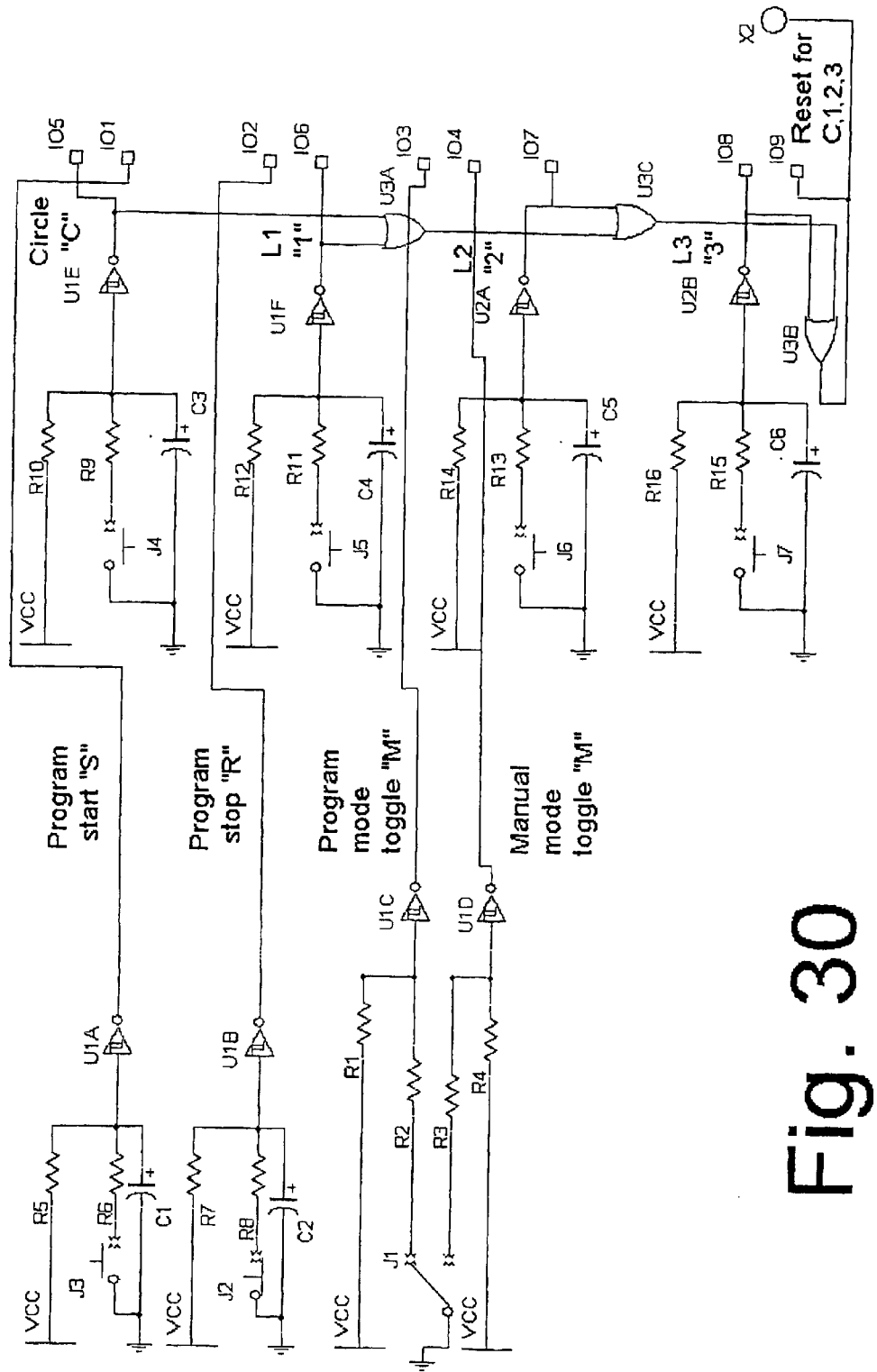

The electrical features of the present invention will now be described as shown in FIGS. 29–35, although these Figures are for exemplary purposes only and the present invention should not be considered as limited exclusively thereto. FIGS. 29–35 represent a complex circuit having a variety of important characteristics which will be described hereinafter. However, for clarity, FIGS. 29–35 interrelate through IO points IO1–IO1–IO18, U1–U11, and X1–X23, which appear in various of FIGS. 29–35, depending on relevance. FIGS. 29 and 30 show the signals which are brought into the system through different switches in manual and program modes, respectively. The signal conditioning blocks which consist of resistor-capacitor combinations and a fast acting Schmitt trigger inverters U1A, U1B, U1C, and U1D (FIGS. 29, 30) do not permit any contact bounces to affect the subsequent parts of the circuit. However, other debouncing mechanisms could also be used other than those shown in FIGS. 29 and 30. In the manual mode, 4-position rotary switches have been used for both the forward-reverse and left-right direction movement signals. However, rocker switches or some other switching mechanism could also be used.

The 'program start' push button 7M (FIG. 22) is a momentary contact, normally open push-button, as are the three Loop and the Circle buttons L1, L2, L3, and C. For safety concerns the stop push-button 7F is a momentary contact, normally dosed button. When either of the loop push-buttons or the circular movement push-button is actuated this information is also indicated by OR-ing these signals using OR gates U3A, U3B, and U3C.

Figure 31:
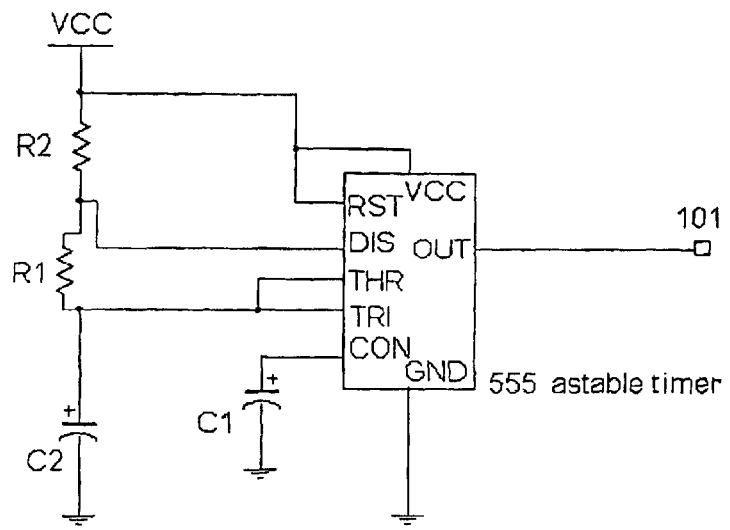
Figure 32:
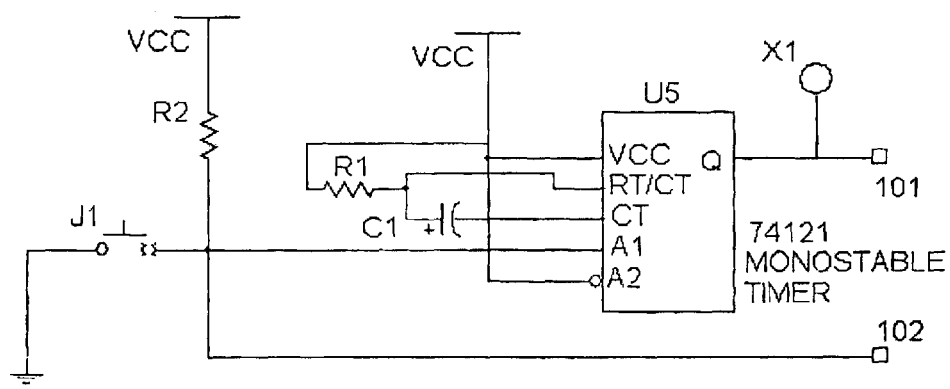

FIGS. 31 and 32 show the timing signals which are generated for use throughout the system. In FIG. 31, a 555 Umer operating in astable mode continually generates pulses of 1 second duration. For the purpose of simulation studies, this time can be shortened using the resistors R2, R1 and capacitor C2. In FIG. 32, a monostable non-retriggerable timer 74121 is used for indicating that the practice fish 100 has entered detected mode by generating a pulse of 5 seconds output at the Q pin.

Figure 33:
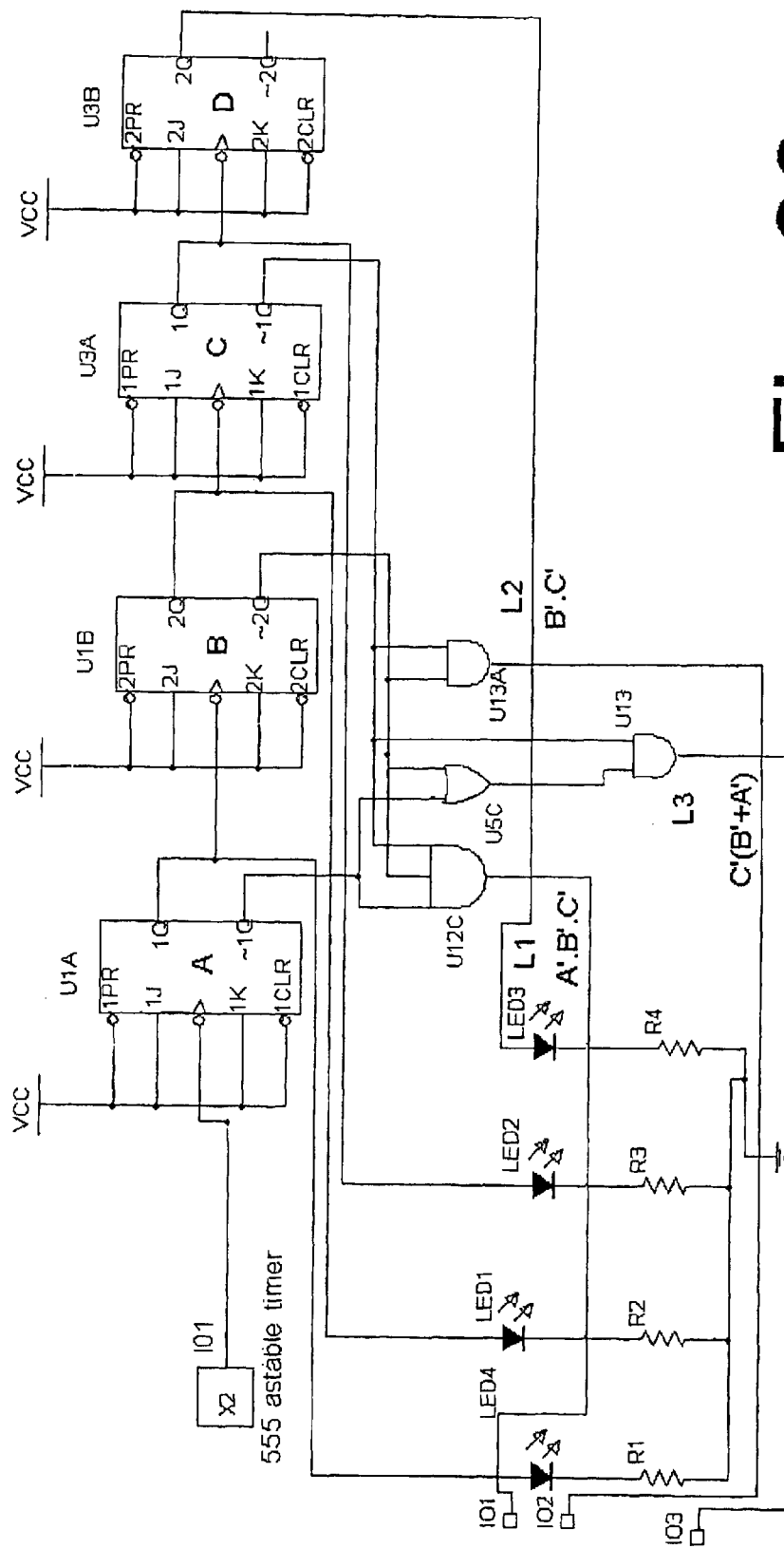
FIGS. 33–34 loop timing control blocks of the present invention.

FIG. 33 shows the circuit for generating the timing control for the three different loops. The 1 second astable signal included as a nested sub-circuit is successively fed into a series of JK-type flip-flops A, B, C, D operating in toggle mode. This causes the time period of the 1 second pulse to be multiplied successively by a factor of 2 as it passes through each flip-flop. This also generates a count of 0 to 15 if outputs are taken from the output pins of each flip-flop A–D.

For the smallest loop, the circular control mechanism would be activated when the count is 0 and again when it is at 8. For a count of 1 to 7, and again from 9 to 15, the circle control is turned off, so only linear motion can occur. Using circuit minimization techniques a logic gate minimization using AND and OR gates is developed for the function representing when the loop 1 output should be energized. FIG. 33 shows but one possible implementation of an array of logic gates, however the present invention should not be considered as limited exclusively to the circuit shown in FIG. 33. The LEDs shown in FIG. 33 are useful for indicating the counter states during manufacturing and test of the practice fish 100.

For successively larger loops, one additional count is added to the on period for which the circular control mechanism is turned on. Hence, in loop 2 the mechanism is on for count of 0, 1 and 8, 9; while in loop 3 it is on for a count of 0, 1, 2 and 8, 9, 10. Again, it is to be emphasized that the above FIGS. 29–33 are for exemplary purposes only, and other type of circuits could also be employed within the scope of the present invention.

Figure 34:
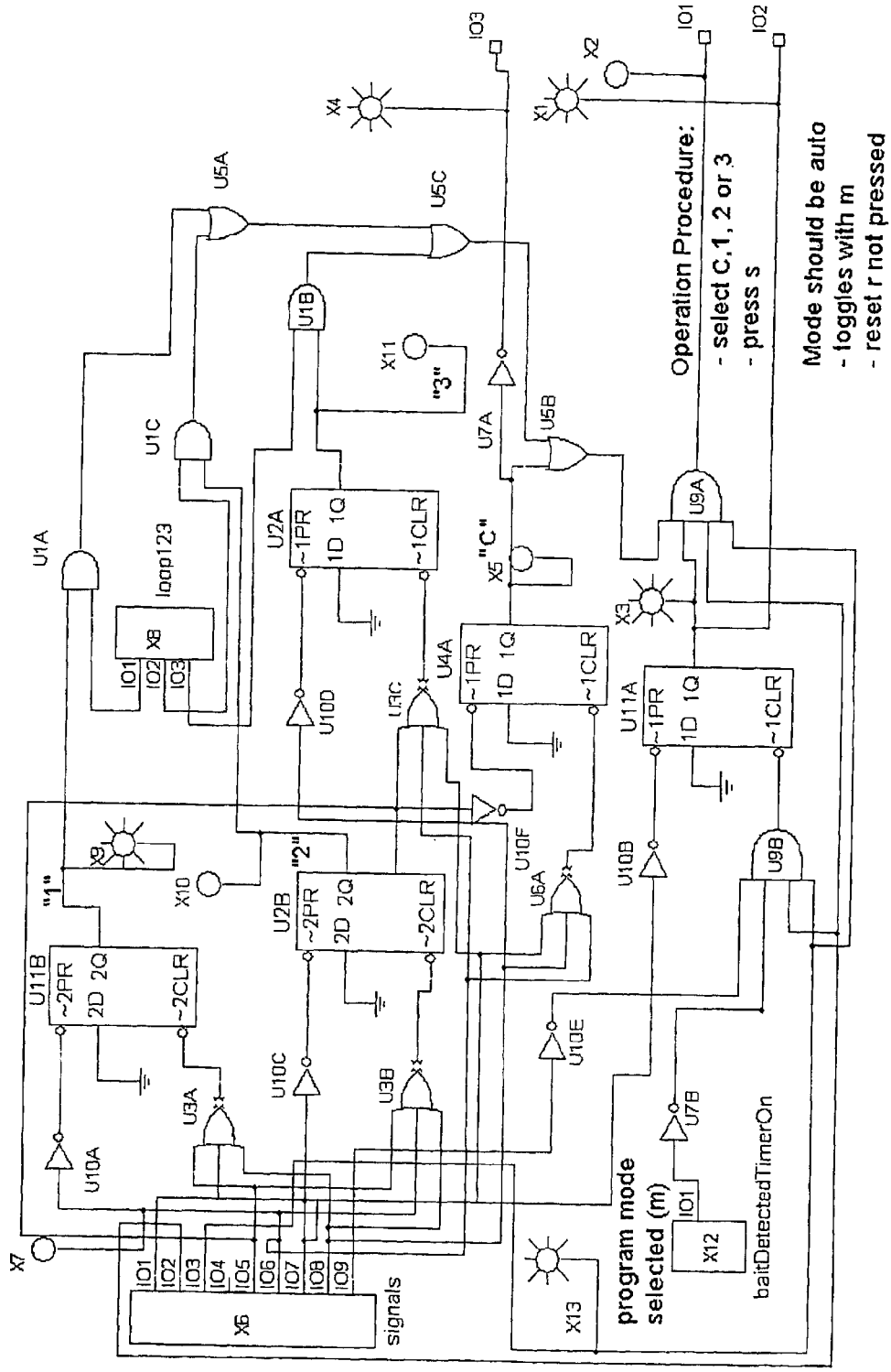

FIG. 34 shows a circuit directed toward the program mode movement control of the fish. FIG. 34 incorporates several sub-circuits: the timing from the loop control block shown in FIG. 33, the signal conditioning block of FIG. 29 for manual mode, as well as the logic blocks of FIG. 30 for program mode.

As shown in FIG. 34, D-type flip-flops are used so that the push button signals generated by the program mode are latched. When the push button of loop 1, for example, 1 is pressed, the particular flip-flop associated with it is set, and simultaneously a reset pulse is applied to the other 3 flip-flops loop 2, loop 3 and circle movement. All of the outputs from theses flip-flops are OR-ed together at OR gates U5A, U5B, and U5C (FIG. 34), and await initiation of the cycle by pressing of the program start push-button 7M while in program mode.

Figure 35:
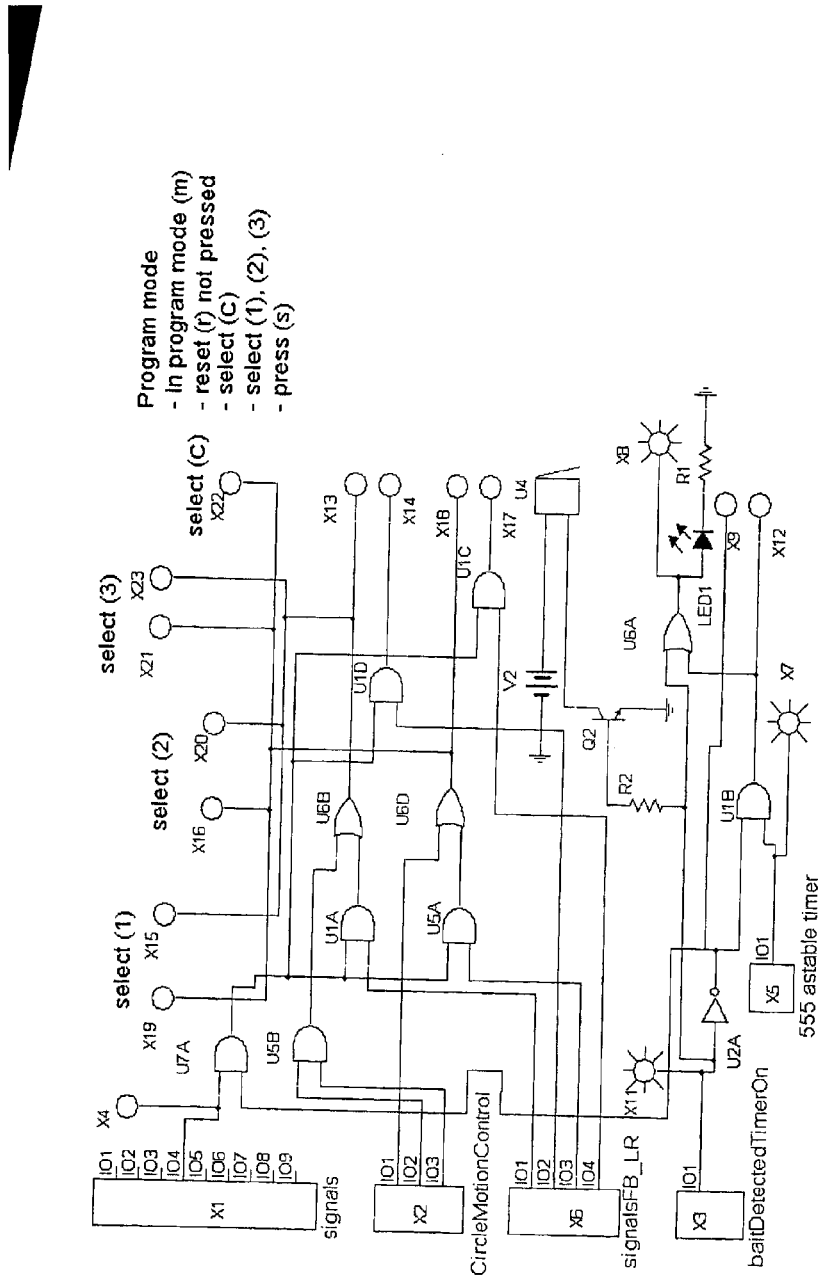
FIG. 35 shows an overall control block of the present invention.

FIG. 35 combines the functionality of the program mode block along with that of the manual mode and generates outputs for controlling the different movements in the fish as well as status indications. It also lists the steps which a operator must take to initiate different modes of operation, showing the pushbuttons/switches to be pressed.

Additionally, FIG. 35 indicates through the use of probe signals whether the lure 5/6 has been detected. When in seeking mode, the practice fish 100 has its tail motor on as indicated by the LED signal, its buzzer off and its eyes blinking once every second. This is achieved through the use of the 555 astable timer and absence of the "bait detected" pulse, as shown at logical positions U1B and U6A at the bottom of FIG. 35. Once in detected mode, all movement in the fish stops for 5 seconds, the buzzer is turned on and the LEDs glow steadily.

Probe points have been liberally incorporated in the circuits of the present invention for evaluating the state of signals at various points. For example, FIGS. 29–35 all show probe points for indicating loop control which includes both circular and linear components. While in a loop the linear movement is always on, while the circular movement is initiated at specific intervals. By looking at the probe points it is possible to evaluate the movement occurring in the system and make appropriate adjustments to the circuits during manufacture and test.

Again, FIGS. 29–35 are for exemplary purposes only, and the present invention should not be considered limited exclusively to the implementations shown therein. For example, a programmable logic device such as the GAL 16v8 chip could be implemented for moving a significant part of the digital circuitry used for controlling the output signals onto a programmable chip.

It is anticipated that various changes may be made in the arrangement and operation of the system of the present invention without departing from the spirit and scope of the invention, as defined by the following claims.

What is claimed is:

1. A system for practicing fishing casts, comprising:

a motorized mechanical fish having a plurality of wheels;

a lure for being cast near to said fish;

a detection mechanism within said fish for detecting said lure; and an electro-mechanical control module also within said fish for managing the fish's movements while seeking and having detected said lure.

2. The system of claim 1, further comprising:
a chassis from which extend said wheels;
a mechanical steering mechanism connected to said wheels; and
a fish-shaped outer shell attached to said chassis and having front and rear ends.

3. The system of claim 2, wherein wheels are attached to said chassis via a spring suspension.

4. The system of claim 3, wherein a tire located within each of said wheels is covered with cast hard rubber.

5. The system of claim 2, further comprising:
a plurality of lugs and mounting detents protruding from said chassis, thereby enabling the attachment and detachment of said fish-shaped outer shell.

6. The system of claim 2, further comprising:
a rechargeable battery mounted to said chassis.

7. The system of claim 6, further comprising a plug-in unit for said battery which is accessible for charging without removing said battery from said chassis.

8. The system of claim 2, wherein said detection mechanism further comprises:
active and passive photo sensors; located within a front end of said outer shell; and
a passive/active switch also located within said outer shell for enabling the user to select between passive and active modes of detection.

9. The system of claim 2, wherein said electro-mechanical control module further comprises
a timer.
a tail motor;
a radio receiver; and
an antenna, all located within said outer shell; and
a drive motor, located within said chassis.

10. The system of claim 9, wherein said mechanical steering mechanism further comprises:
a front-wheel steering linkage;
a steering solenoid having a plurality of protruding lugs thereby permitting automated steering; wherein said steering solenoid can also be positioned to allow for manual steering via said remote controller.

11. The system of claim 10, further comprising:
wherein said steering solenoid has a plurality of positions, thereby enabling automated steering in a straight line or steering in a circle of predetermined radius, or combining said straight lines and circles to form loops of varying length and radius, depending upon which of said positions is selected.

12. The system of claim 2, wherein said fish-shaped outer shell is constructed of fiber glass and polyester resin.

13. The system of claim 12, wherein said fish-shaped outer shell is fabricated to resemble a bone fish.

14. The system of claim 12, wherein said fish-shaped outer shell is fabricated to resemble a bass fish.

15. The system of claim 12, wherein said fish-shaped outer shell further comprises:
a hole near a front end of said outer shell, for providing an unrestricted path for transmission and reception of infrared light beams used in conjunction with said mechanism for the detection of said lure;
two holes near said front end of said outer shell, for providing an unrestricted path for the emission of visible light from two LEDs which resemble fish eyes;
a plurality of ports at the base of said outer shell providing a path for sound to exit from a plurality of speakers;
an antenna selected from the group of an internal antenna and an external antenna, where an outlet hole near the top of said outer shell is provided when an external antenna is selected; and
a hinged tail, providing capability of motion of said tail when used in conjunction with said tail motor.

16. The system of claim 15, wherein said antenna is an internal antenna.

17. The system of claim 10, further comprising:
a remote controller for directing the motion of said fish, said remote controller comprising:
a battery, installably and rechargeably located within a body of said remote controller;
a battery power display located on a front panel of said remote controller;
an antenna located either within or protruding from said body of said remote controller;
an emergency stop button located in an easily-accessible portion of said front panel;
forward/reverse and left/right toggle switches located within said front panel, for control of said fish while in a manually-operated (manual) mode;
a program stop/start button located within said front panel, for transitioning from said manual mode to an automated mode; and
a program selection/display switch located within said front panel.

18. The system of claim 17, wherein said selection/display switch enables an operator to place the mechanical fish into said automated mode wherein said mechanical fish travels either in a circle or in a plurality of loop modes.

19. The system of claim 18, wherein the diameter of said circle mode is controlled by said steering solenoid.

20. The system of claim 18, wherein the diameter of the semicircles of said loops are regulated by said steering solenoid; and
the length of straight travel between the two semicircles is regulated by a timer and varies depending upon which setting is selected on said program selection/display switch.

21. The system of claim 1, wherein said lure further comprises:
a lead dumbbell eye, to more closely replicate the casting nature of a weighted fishing lure;
an outer covering;
a battery;
a circuit board;
three infrared light emitting diodes (LEDs) attached to said circuit board and visible through said outer covering; and
an additional LED which emits green light to enable the user to know the infrared LEDs are emitting IR light.

22. The system of claim 21, wherein said outer covering is constructed of a clear, infrared-transparent hard plastic to ensure durability of said lure.

23. The system of claim 22, wherein said circuit board periodically sends the necessary electrical current to said infrared LEDs enabling them to emit pulses of infrared light.

24. The system of claim 1, wherein said lure further comprises:
an unweighted eye, to more closely replicate the casting nature of a fishing fly;
a closed loop hook, to prevent unintentional snagging; and a head assembly;

wherein said lure is either coated with or composed of a reflective material.

25. The system of claim 24, wherein said head assembly is coated with a plastic cast or epoxy coated head for purposes of attaching said reflective tail material to said closed loop hook.

26. The system of claim 24, wherein said reflective material is composed of a mylar tinsel capable of efficiently reflecting infrared light.

27. The system of claim 26, wherein said reflective material extends along and substantially beyond the length of said closed loop hook.

28. The system of claim 2, further comprising:

an ambient light filter attached to said outer shell, to limit the entry of unwanted visible light thereby restricting light flow to infrared light;

a mirrored collector recess positioned inwardly from a concentrating lens, to direct the incoming light signals to said photo sensor;

a photo sensor positioned at the center of a mirrored collector recess; and an electronic sensing module positioned inside said detection mechanism, for coordinating signals received from said photo sensor;

wherein said electronic sensing module establishes an operator-configurable detection zone outside of which all light signals are ignored.

29. The system of claim 28, wherein said photo sensor is responsive only to infrared light emitted or reflected by said lure when said lure is within said detection zone.

30. The system of claim 28, wherein said electronic sensing module further comprises a plurality of digital logic gates and Schmitt trigger inverters.

31. The system of claim 30, wherein said plurality of digital logic gates are designed to restrict detection to pulses of infrared light received at a particular frequency.

32. The system of claim 30, wherein said plurality of digital logic gates restrict detection to pulses of infrared light received at or above a threshold amplitude.

33. The detection zone of claim 28, wherein said detection zone is semicircular and the diameter of said zone is adjustable.

34. The system of claim 28, wherein said detection mechanism further comprises:

an array of infrared light emitting diodes (LEDs) mounted within a trough, for emitting a ring of light which is to be reflected by said lure;

wherein said trough acts as a buffer wall thereby ensuring that said photo sensor is not accidentally triggered by light from said LED array.

35. The system of claim 34, wherein walls of said trough are highly reflective mirrors capable of directing the infrared light emitted by said LEDs to cover said detection zone.

36. The system of claim 34, wherein an outer wall of said trough is slightly higher than an inner buffer wall, thereby eliminating any blind spot from the center of said ring of emitted infrared light.

37. The system of claim 34, wherein said electronic sensing module is designed to power said LEDs causing them to periodically emit infrared light at the identical frequency said series of digital logic gates are designed to admit reception.

38. The system of claim 1, wherein said electromechanical control module further comprises:

an electrical circuit;

a logic module;

a programmed seeking mode; and a programmed detected mode.

39. The system of claim 38, wherein said electrical circuit receives a signal of detection from said photo sensor and conveys this message to said logic module via a series of digital logic gates.

40. The system of claim 38, wherein said control module regulates all of the actions of said fish while in either of its alternate seeking or detected modes.

41. The system of claim 38, wherein said seeking mode is the default mode of said fish.

42. The system of claim 38, wherein said mechanical fish, while in said seeking mode, exhibits the following traits:

two LED eyes flash at a configurable frequency:

a tail motor oscillates a tail at a configurable frequency;

a plurality of speakers are silent; and said detection mechanism is active.

43. The system of claim 38, wherein said detected mode begins when said logic module receives a signal from a photo sensor confirming the presence of a lure.

44. The system of claim 38, wherein while in said detected mode said fish exhibits the following traits:

a drive motor stops, bringing the fish to a stop;

two LED eyes glow brightly;

two speakers emit a sound similar to the drag slipping when fishing line is quickly pulled from a reel; and a tail motor stops, bringing the motion in the tail of the fish to a stop.

45. The system of claim 38, wherein the actions of said fish differ substantially between said detected mode and said seeking mode such that the user of said practice system can determine whether or not a successful cast was made.

46. A mechanical practice fish system, comprising:

a motor-driven chassis;

an electronic module located within said chassis;

a lure, for being cast near to said fish;

electronic detection means for detecting said lure; and a styled body shape for resembling a specific fish.

47. The system of claim 46, wherein said electronic detection means can operate either in a passive mode or in an active mode.

48. The system of claim 47, wherein said electronic detection means operates in said passive mode by emitting light pulses to a reflecting portion of said lure, waiting for said reflecting portion to reflect said pulses, and then detecting the return of said pulses.

49. The system of claim 47, wherein said electronic detection means operates in said active mode by awaiting light pulses to be emitted from said lure, and then detecting the return of said pulses.

50. A method of utilizing a practice fish, comprising:

providing a practice fish;

activating said practice fish into a seeking mode;

activating an IR beacon within a lure;

repeatedly casting said lure near to said practice fish; and detecting said IR beacon via an electronic module located within said practice fish, thereby changing a mode of said practice fish from said seeking mode into a detected mode.

51. A method of utilizing a practice fish, comprising:
providing a practice fish;
activating said practice fish into a seeking mode;
sending IR signals from within said practice fish;
repeatedly casting a lure near to said practice fish;
reflecting said IR signals from said lure;
detecting said reflected IR signals via an electronic module located within said practice fish, thereby
changing a mode of said practice fish from said seeking mode into a detected mode.

* * * * *